US012628034B2

(12) United States Patent
Esswie

(10) Patent No.: US 12,628,034 B2
(45) Date of Patent: May 12, 2026

(54) RELATIVE QUALITY OF SERVICE ADAPTATION OF BI-DIRECTIONAL MULTI-MODE TRAFFIC

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 18/466,541

(22) Filed: Sep. 13, 2023

(65) Prior Publication Data

US 2025/0088896 A1 Mar. 13, 2025

(51) Int. Cl.
| | |
|---|---|
| *H04W 28/02* | (2009.01) |
| *H04L 47/2475* | (2022.01) |
| *H04L 69/18* | (2022.01) |

(52) U.S. Cl.
CPC ..... *H04W 28/0268* (2013.01); *H04L 47/2475* (2013.01); *H04L 69/18* (2013.01); *H04W 28/0221* (2013.01)

(58) Field of Classification Search
CPC ....... H04L 1/08; H04L 41/0816; H04L 47/24; H04L 47/2475; H04L 47/32; H04L 69/18; H04W 24/08; H04W 24/10; H04W 28/02; H04W 28/0221; H04W 28/0268; H04W 28/0278; H04W 28/10; H04W 72/21; H04W 72/543; H04W 76/14
See application file for complete search history.

(56) References Cited

U.S. PATENT DOCUMENTS

| | | | | |
|---|---|---|---|---|
| 2009/0268684 A1* | 10/2009 | Lott | .............. | H04W 72/543 |
| | | | | 370/329 |
| 2019/0098544 A1* | 3/2019 | Han | .......... | H04W 36/0044 |
| 2022/0104062 A1* | 3/2022 | Aijaz | ........... | H04W 28/0268 |

FOREIGN PATENT DOCUMENTS

WO        2019/158219        8/2019

OTHER PUBLICATIONS

International Search Report and Written Opinion mailed May 28, 2024 for PCT Application No. PCT/US2024/013887, 17 pages.

(Continued)

*Primary Examiner* — Christopher Biagini
(74) *Attorney, Agent, or Firm* — Amin, Turocy & Watson, LLP

(57) ABSTRACT

A radio access network node is configured with a relative quality-of-service criterion corresponding to a target traffic flow and a related traffic flow. The node may schedule, for transmission to a user equipment, a packet corresponding to the target flow based on the relative quality-of-service criterion. The quality-of-service criterion may be indicated by core network equipment in an indication that may accompany the packet corresponding to the target flow, which may be a downlink flow. The quality-of-service criterion may be indicated by a user equipment in an indication that may accompany the packet corresponding to the target flow, which may be an uplink flow. The user equipment may receive, from the node, a packet of the target flow via a shareable semi-persistent downlink scheduling occasion resource without waiting for a grant of the resource from the node.

20 Claims, 21 Drawing Sheets

(56) References Cited

OTHER PUBLICATIONS

Michael Starsinic—Interdigital et al: "Discussion on Using PDU Set Importance", 3GPP Draft; S2-2301217; 3GPP SA 2 Meeting #155-AH-e, [https://www.3gpp.org/ftp/tsg_sa/WG2_Ar ch/TSGS2_ 154AHE_Electronic_2023-01/Docs/S2-2301217.zipS2-2301217_ KI4_KI5_Discussion_PDU_Set_Importance.doc], Jan. 2023, 2 pages. Notification Concerning Transmittal of International Preliminary Report on Patentability for PCT Application No. PCT/US2024/ 013887 mailed Mar. 26, 2026, 10 pages.

* cited by examiner

300

400

| Relative QFI profile list | |
|---|---|
| Relative QFI profile $x_1$ | Relative maximum buffering delay to relative QFI |
| | Relative allowable packet error rate percentile to relative QFI |
| | .. |
| .. | .. |
| Relative QFI profile $x_n$ | Relative maximum buffering delay to relative QFI |
| | Relative delivered data rate percentile to relative QFI |
| | .. |

Uplink control channel (UCI)

• Existing UCI information elements
• ...
• Novel relative downlink-uplink QoS enforcement criteria
  → Relative downlink QFI indication,
  → Relative downlink packet data unit/set group of the relative downlink QFI, or
  → Relative QoS profile indication to be fulfilled by the received packet in reference to the relative downlink QFI 707    810    815    820

800

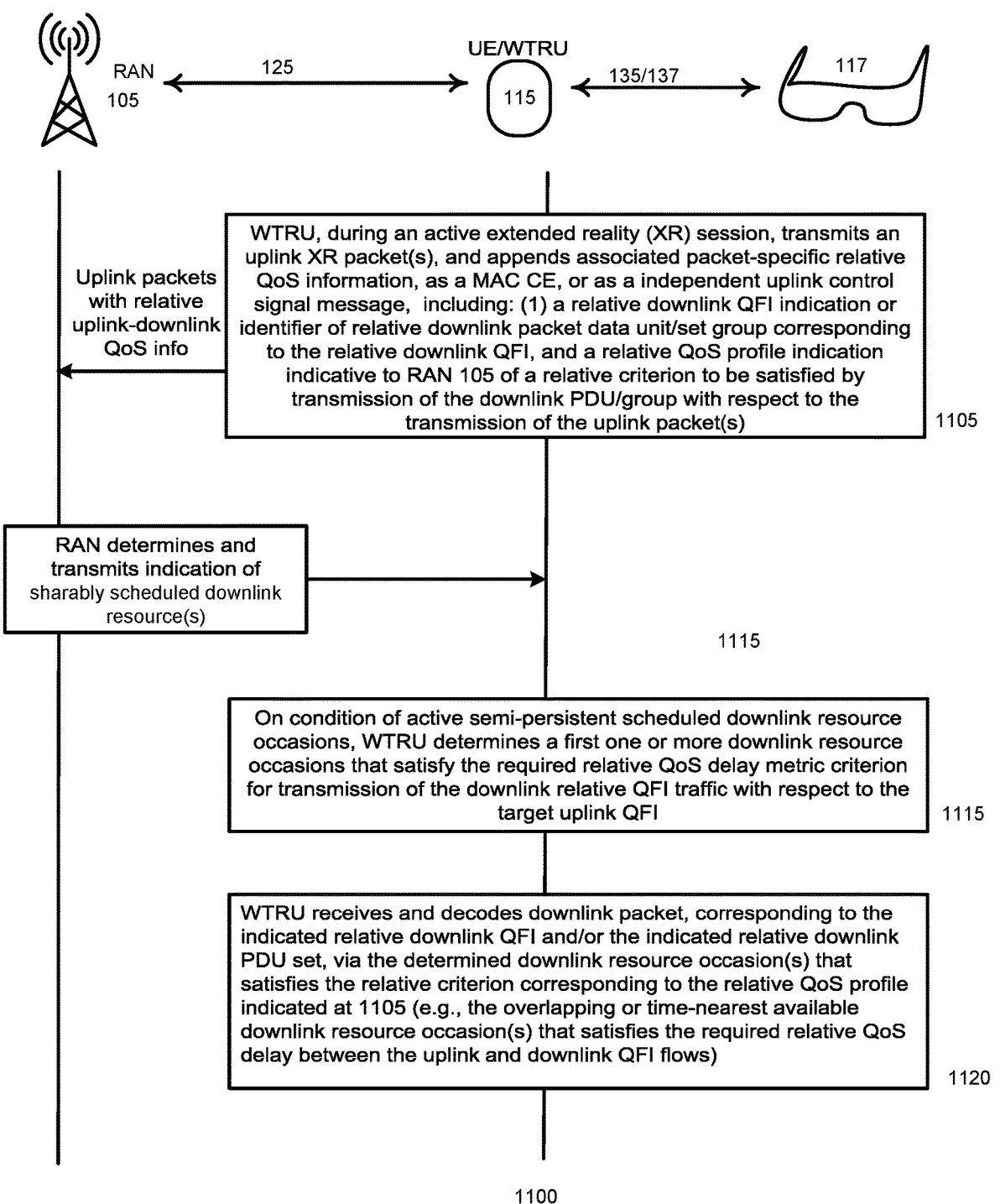

RAN
105

125

UE/WTRU

115

135/137

117

Uplink packets
with relative
uplink-downlink
QoS info

WTRU, during an active extended reality (XR) session, transmits an
uplink XR packet(s), and appends associated packet-specific relative
QoS information, as a MAC CE, or as a independent uplink control
signal message,  including: (1) a relative downlink QFI indication or
identifier of relative downlink packet data unit/set group corresponding
to the relative downlink QFI, and a relative QoS profile indication
indicative to RAN 105 of a relative criterion to be satisfied by
transmission of the downlink PDU/group with respect to the
transmission of the uplink packet(s)

1105

RAN determines and
transmits indication of
sharably scheduled downlink
resource(s)

1115

On condition of active semi-persistent scheduled downlink resource
occasions, WTRU determines a first one or more downlink resource
occasions that satisfy the required relative QoS delay metric criterion
for transmission of the downlink relative QFI traffic with respect to the
target uplink QFI

1115

WTRU receives and decodes downlink packet, corresponding to the
indicated relative downlink QFI and/or the indicated relative downlink
PDU set, via the determined downlink resource occasion(s) that
satisfies the relative criterion corresponding to the relative QoS profile
indicated at 1105 (e.g., the overlapping or time-nearest available
downlink resource occasion(s) that satisfies the required relative QoS
delay between the uplink and downlink QFI flows)

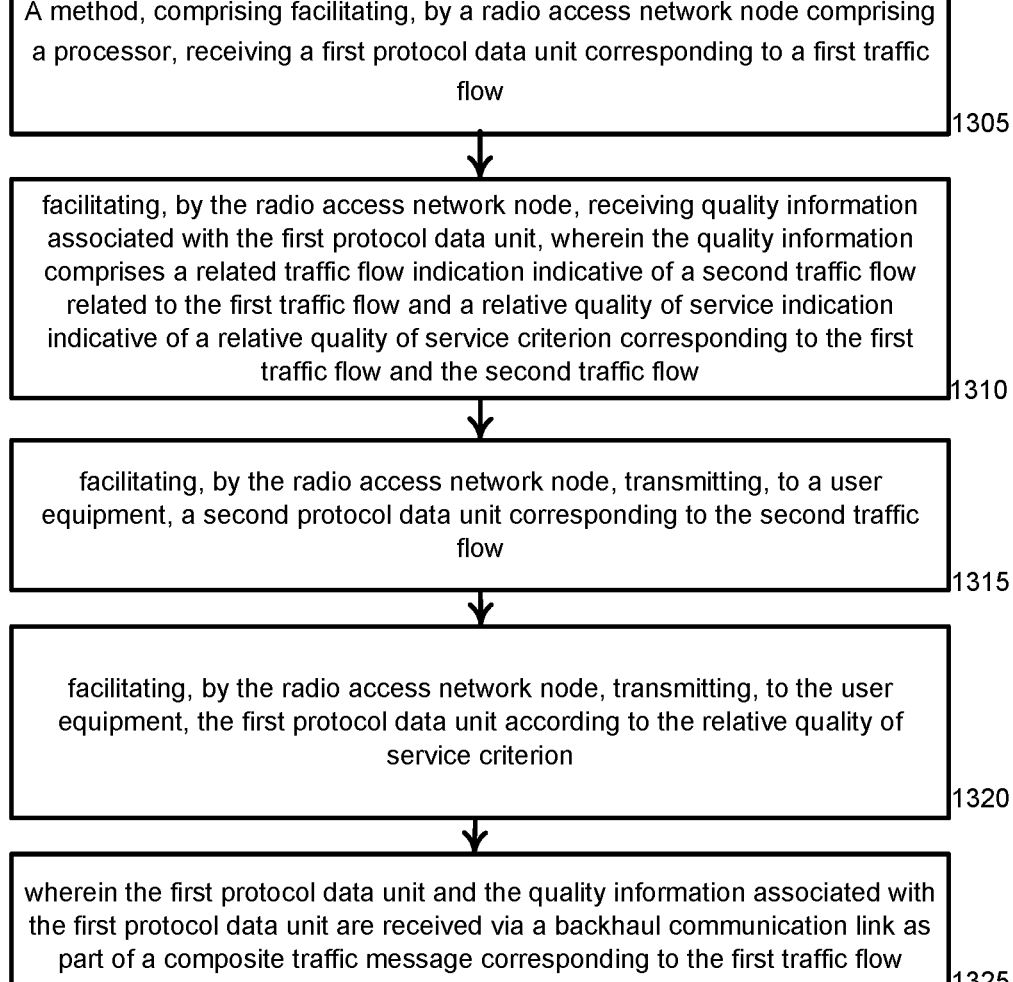

A method, comprising facilitating, by a radio access network node comprising a processor, receiving a first protocol data unit corresponding to a first traffic flow

1305 facilitating, by the radio access network node, receiving quality information associated with the first protocol data unit, wherein the quality information comprises a related traffic flow indication indicative of a second traffic flow related to the first traffic flow and a relative quality of service indication indicative of a relative quality of service criterion corresponding to the first traffic flow and the second traffic flow

1310 facilitating, by the radio access network node, transmitting, to a user equipment, a second protocol data unit corresponding to the second traffic flow

1315 facilitating, by the radio access network node, transmitting, to the user equipment, the first protocol data unit according to the relative quality of service criterion

1320 wherein the first protocol data unit and the quality information associated with the first protocol data unit are received via a backhaul communication link as part of a composite traffic message corresponding to the first traffic flow

Figure 14:
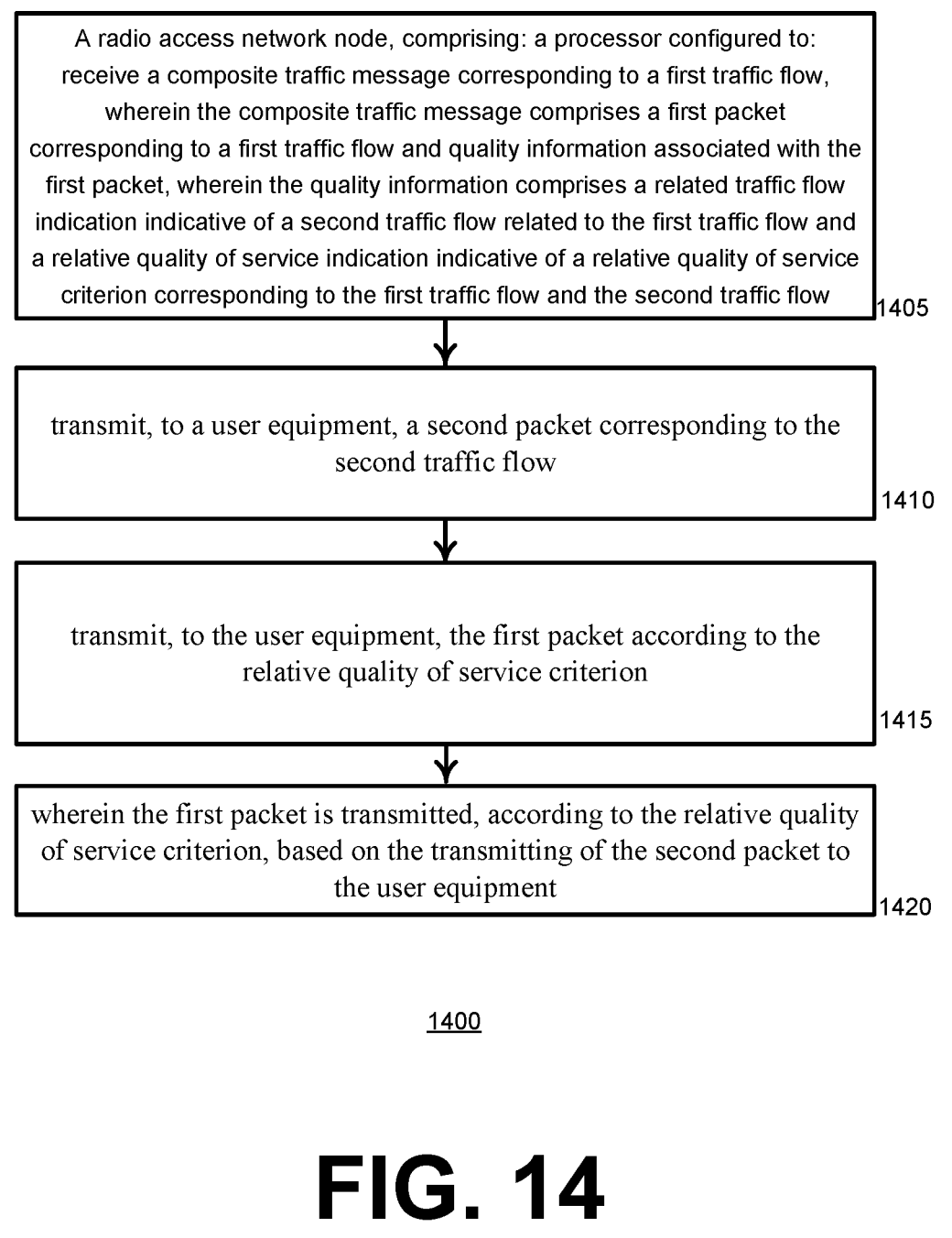

A radio access network node, comprising: a processor configured to: receive a composite traffic message corresponding to a first traffic flow, wherein the composite traffic message comprises a first packet corresponding to a first traffic flow and quality information associated with the first packet, wherein the quality information comprises a related traffic flow indication indicative of a second traffic flow related to the first traffic flow and a relative quality of service indication indicative of a relative quality of service criterion corresponding to the first traffic flow and the second traffic flow
1405 transmit, to a user equipment, a second packet corresponding to the second traffic flow
1410 transmit, to the user equipment, the first packet according to the relative quality of service criterion
1415 wherein the first packet is transmitted, according to the relative quality of service criterion, based on the transmitting of the second packet to the user equipment
1420

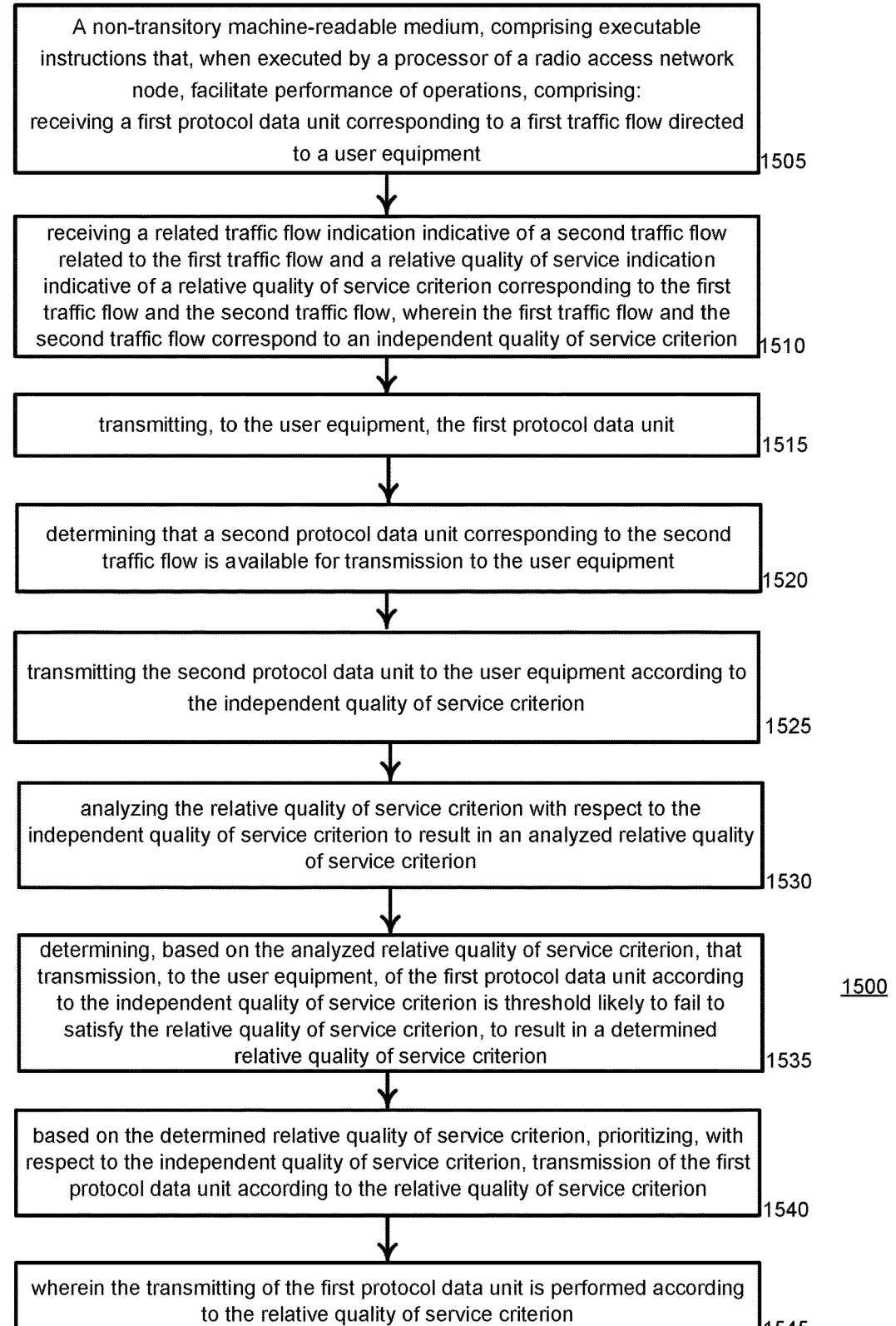

A non-transitory machine-readable medium, comprising executable instructions that, when executed by a processor of a radio access network node, facilitate performance of operations, comprising:
receiving a first protocol data unit corresponding to a first traffic flow directed to a user equipment

1505 receiving a related traffic flow indication indicative of a second traffic flow related to the first traffic flow and a relative quality of service indication indicative of a relative quality of service criterion corresponding to the first traffic flow and the second traffic flow, wherein the first traffic flow and the second traffic flow correspond to an independent quality of service criterion

1510 transmitting, to the user equipment, the first protocol data unit

1515 determining that a second protocol data unit corresponding to the second traffic flow is available for transmission to the user equipment

1520 transmitting the second protocol data unit to the user equipment according to the independent quality of service criterion

1525 analyzing the relative quality of service criterion with respect to the independent quality of service criterion to result in an analyzed relative quality of service criterion

1530 determining, based on the analyzed relative quality of service criterion, that transmission, to the user equipment, of the first protocol data unit according to the independent quality of service criterion is threshold likely to fail to satisfy the relative quality of service criterion, to result in a determined relative quality of service criterion

1535 based on the determined relative quality of service criterion, prioritizing, with respect to the independent quality of service criterion, transmission of the first protocol data unit according to the relative quality of service criterion

1540 wherein the transmitting of the first protocol data unit is performed according to the relative quality of service criterion

Figure 16:
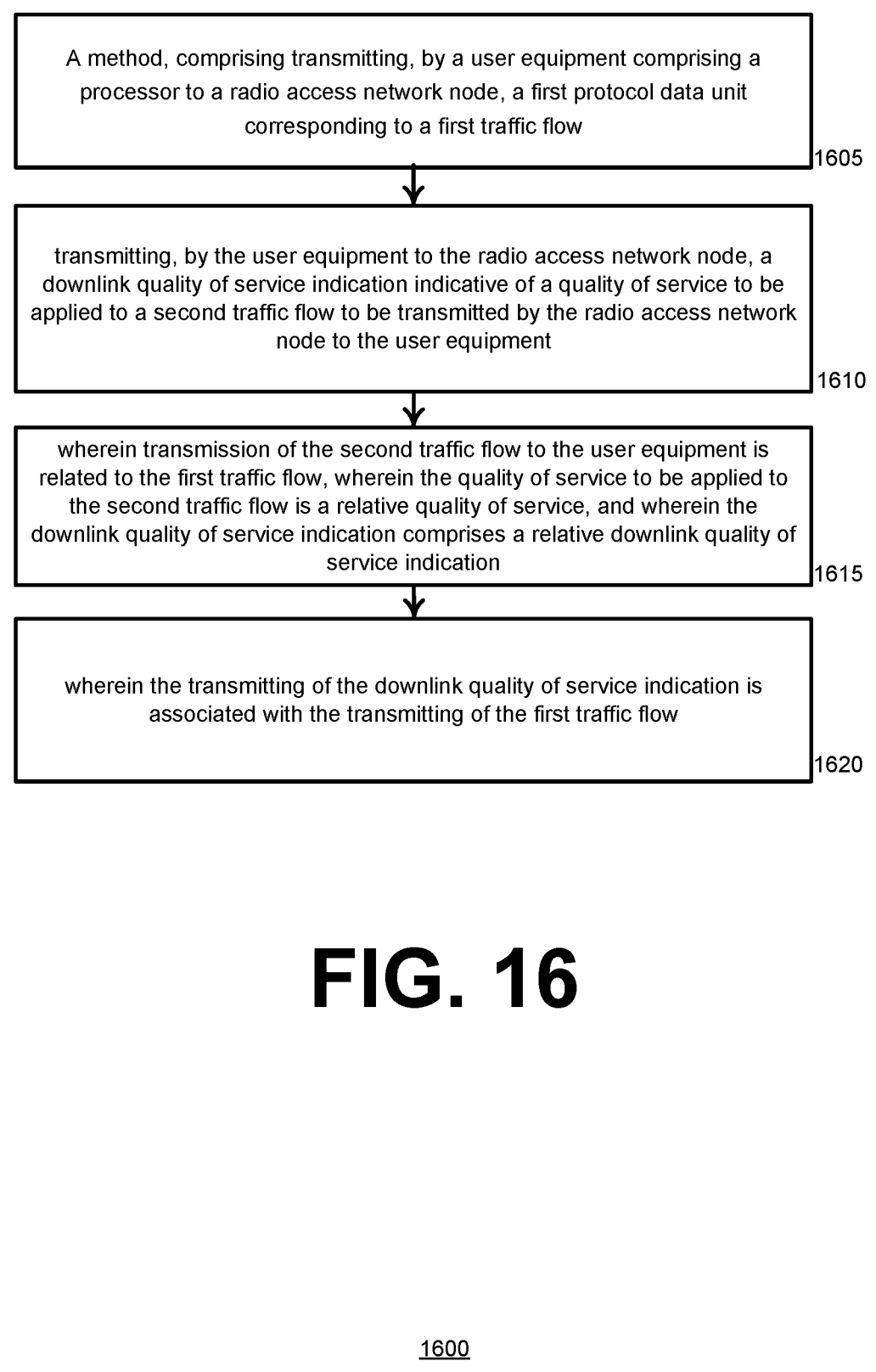

A method, comprising transmitting, by a user equipment comprising a processor to a radio access network node, a first protocol data unit corresponding to a first traffic flow

1605 transmitting, by the user equipment to the radio access network node, a downlink quality of service indication indicative of a quality of service to be applied to a second traffic flow to be transmitted by the radio access network node to the user equipment

1610 wherein transmission of the second traffic flow to the user equipment is related to the first traffic flow, wherein the quality of service to be applied to the second traffic flow is a relative quality of service, and wherein the downlink quality of service indication comprises a relative downlink quality of service indication

1615 wherein the transmitting of the downlink quality of service indication is associated with the transmitting of the first traffic flow

Figure 17:
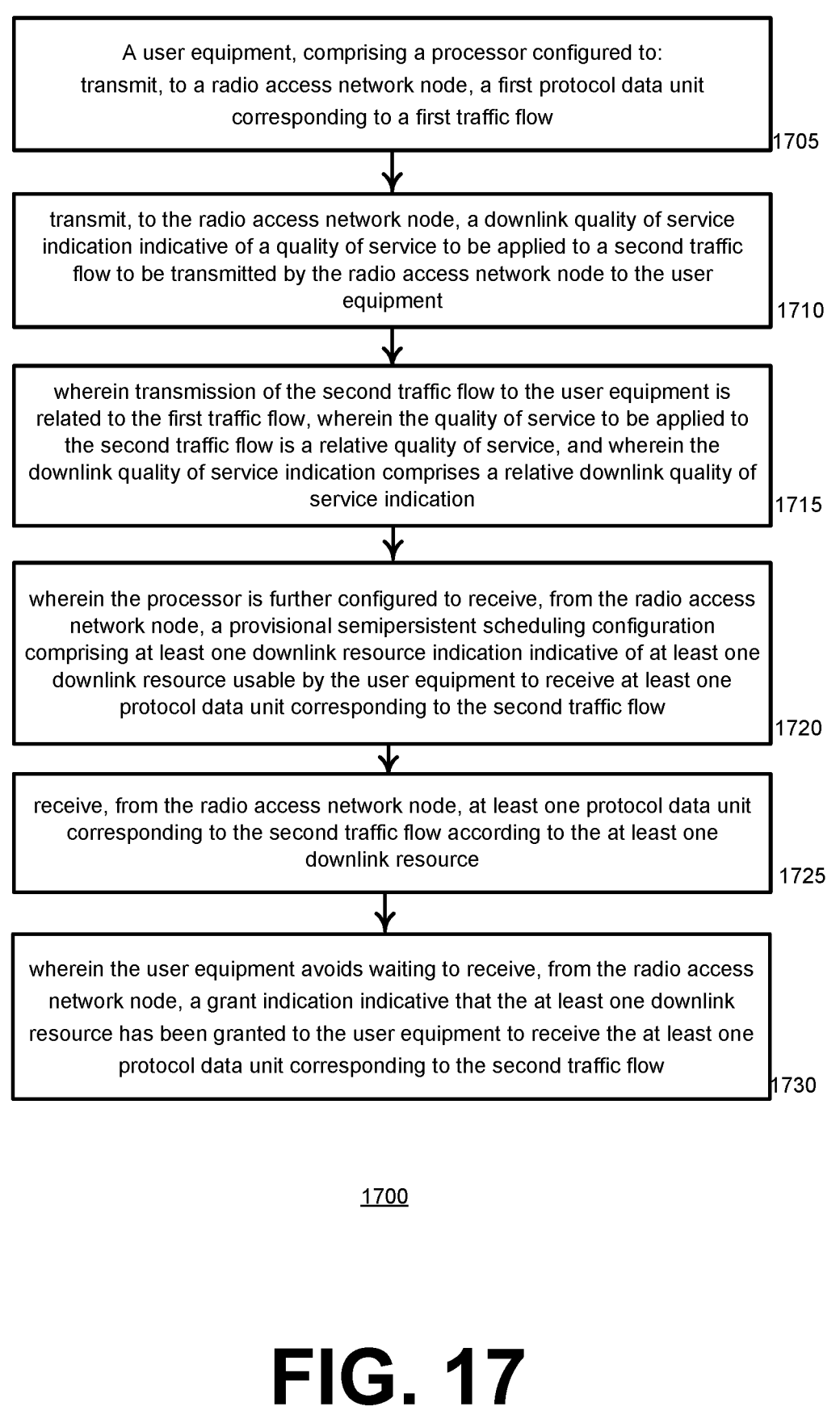

A user equipment, comprising a processor configured to:
transmit, to a radio access network node, a first protocol data unit
corresponding to a first traffic flow

1705 transmit, to the radio access network node, a downlink quality of service
indication indicative of a quality of service to be applied to a second traffic
flow to be transmitted by the radio access network node to the user
equipment

1710 wherein transmission of the second traffic flow to the user equipment is
related to the first traffic flow, wherein the quality of service to be applied to
the second traffic flow is a relative quality of service, and wherein the
downlink quality of service indication comprises a relative downlink quality of
service indication

1715 wherein the processor is further configured to receive, from the radio access
network node, a provisional semipersistent scheduling configuration
comprising at least one downlink resource indication indicative of at least one
downlink resource usable by the user equipment to receive at least one
protocol data unit corresponding to the second traffic flow

1720 receive, from the radio access network node, at least one protocol data unit
corresponding to the second traffic flow according to the at least one
downlink resource

1725 wherein the user equipment avoids waiting to receive, from the radio access
network node, a grant indication indicative that the at least one downlink
resource has been granted to the user equipment to receive the at least one
protocol data unit corresponding to the second traffic flow

Figure 18:
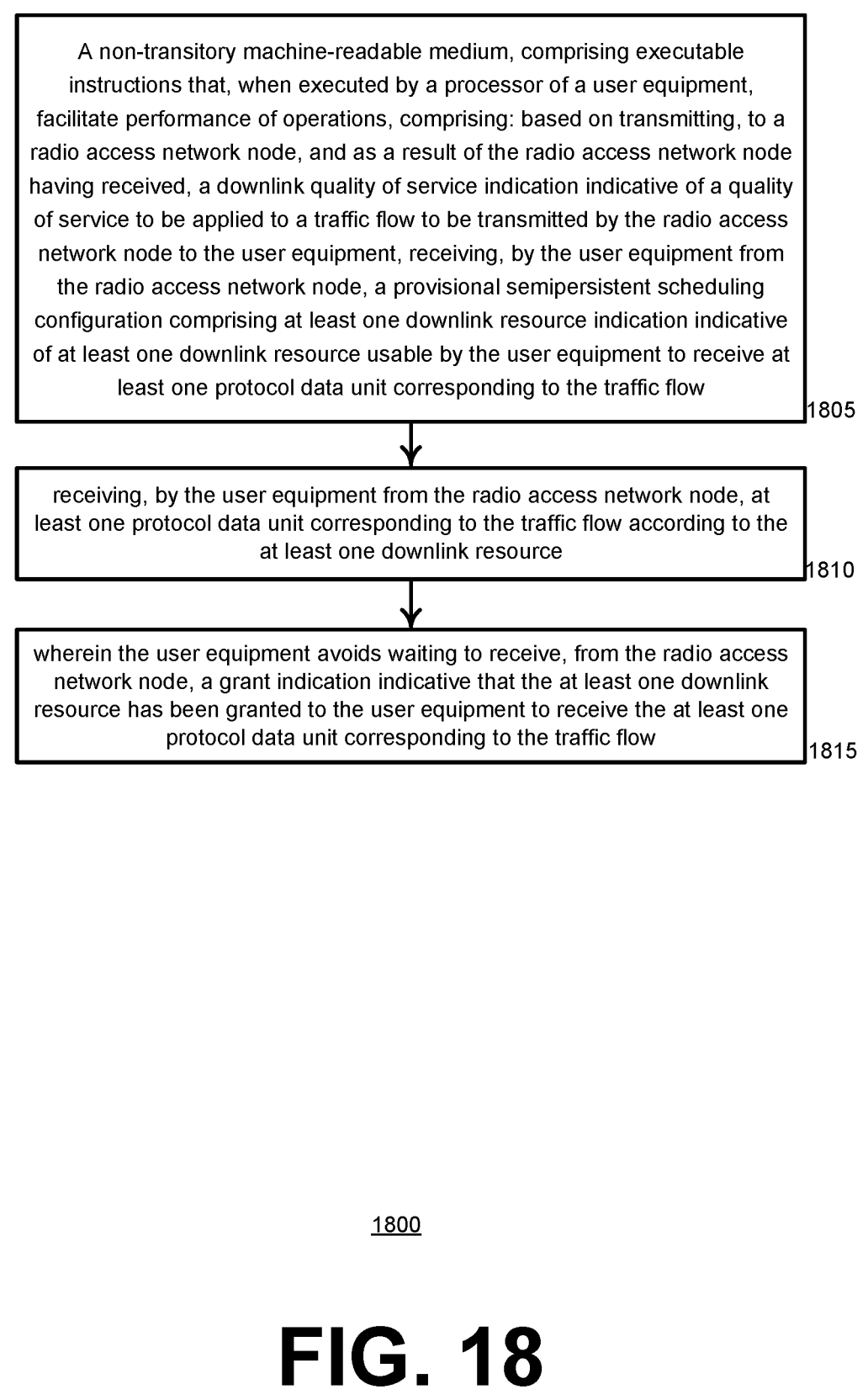

A non-transitory machine-readable medium, comprising executable instructions that, when executed by a processor of a user equipment, facilitate performance of operations, comprising: based on transmitting, to a radio access network node, and as a result of the radio access network node having received, a downlink quality of service indication indicative of a quality of service to be applied to a traffic flow to be transmitted by the radio access network node to the user equipment, receiving, by the user equipment from the radio access network node, a provisional semipersistent scheduling configuration comprising at least one downlink resource indication indicative of at least one downlink resource usable by the user equipment to receive at least one protocol data unit corresponding to the traffic flow
1805 receiving, by the user equipment from the radio access network node, at least one protocol data unit corresponding to the traffic flow according to the at least one downlink resource
1810 wherein the user equipment avoids waiting to receive, from the radio access network node, a grant indication indicative that the at least one downlink resource has been granted to the user equipment to receive the at least one protocol data unit corresponding to the traffic flow
1815

RELATIVE QUALITY OF SERVICE ADAPTATION OF BI-DIRECTIONAL MULTI-MODE TRAFFIC

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a radio access network node comprising a processor, receiving a first protocol data unit corresponding to a first traffic flow and facilitating, by the radio access network node, receiving quality information associated with the first protocol data unit, wherein the quality information comprises a related traffic flow indication indicative of a second traffic flow related to the first traffic flow and a relative quality of service indication indicative of a relative quality of service criterion corresponding to the first traffic flow and the second traffic flow The method may further comprise facilitating, by the radio access network node, transmitting, to a user equipment, a second protocol data unit corresponding to the second traffic flow, and facilitating, by the radio access network node, transmitting, to the user equipment, the first protocol data unit according to the relative quality of service criterion.

In an embodiment, the quality information may further comprise a first independent quality of service indication indicative of an independent quality of service criterion associated with the first traffic flow. The quality information may further comprise a second independent quality of service indication indicative of the second traffic flow being associated with the independent quality of service criterion.

The first protocol data unit may be transmitted according to the independent quality of service criterion, and the second protocol data unit may be transmitted according to the independent quality of service criterion.

In an embodiment, the relative quality of service criterion may correspond to at least one of: a latency corresponding to at least one of the first traffic flow or the second traffic flow, a data rate corresponding to at least one of the first traffic flow or the second traffic flow, or a protocol data unit error rate corresponding to at least one of the first traffic flow or the second traffic flow.

The method may further comprise prioritizing, by the radio access network node with respect to the independent quality of service criterion, the transmitting of the first traffic flow and the second traffic flow, the prioritizing being performed based on the relative quality of service criterion. Thus, the radio access network node may override the independent quality of service criterion and apply the relative quality of service criterion to transmission of the first traffic flow instead of applying the independent quality of service to transmission of the first traffic flow.

In an embodiment, the method may further comprise facilitating, by the radio access network node, receiving a relative quality of service criterion configuration comprising the relative quality of service criterion. The relative quality of service criterion configuration may define the relative quality of service criterion with respect to the independent quality of service criterion.

In an embodiment, the method may further comprise prioritizing, by the radio access network node with respect to the relative quality of service criterion, the transmitting of the first traffic flow and the second traffic flow, the prioritizing being performed based on the independent quality of service criterion. Thus, the radio access network node may apply the independent quality of service criterion to transmission of the first traffic flow.

The quality information may be received from a core network entity. The core network entity may comprise a user plane function or a session management function.

In an embodiment, the first protocol data unit and the quality information associated with the first protocol data unit may be received via a backhaul communication link as part of a composite traffic message corresponding to the first traffic flow. Thus, the first protocol data unit and the quality information associated with the first protocol data unit may be received together via the first traffic flow.

In another example embodiment, a radio access network node may comprise a processor configured to receive a composite traffic message corresponding to a first traffic flow, wherein the composite traffic message comprises a first packet corresponding to a first traffic flow and quality information associated with the first packet, wherein the quality information comprises a related traffic flow indication indicative of a second traffic flow related to the first traffic flow and a relative quality of service indication indicative of a relative quality of service criterion corresponding to the first traffic flow and the second traffic flow. The processor may be further configured to transmit, to a user equipment, a second packet corresponding to the second traffic flow and to transmit, to the user equipment, the first packet according to the relative quality of service criterion.

The quality information may further comprise a first independent quality of service indication indicative of an independent quality of service criterion associated with the first traffic flow. The quality information may further comprise a second independent quality of service indication indicative of the second traffic flow being associated with the independent quality of service criterion. The first packet may be transmitted further according to the independent quality of service criterion and the second packet may be transmitted further according to the independent quality of service criterion.

In an embodiment, the processor may be further configured to receive, from core network equipment, a relative quality of service criterion configuration comprising the relative quality of service criterion. The related traffic flow indication may comprise an index that corresponds, in the relative quality of service criterion configuration, to the relative quality of service criterion.

The first packet may be transmitted, according to the relative quality of service criterion, based on the transmitting of the second packet to the user equipment (e.g., within a relative quality of service latency criterion reference to a time that the second packet was transmitted to the user equipment).

The quality information may be received from a core network entity.

In yet another example embodiment, a non-transitory machine-readable medium, may comprise executable instructions that, when executed by a processor of a radio access network node, facilitate performance of operations, comprising receiving a first protocol data unit corresponding to a first traffic flow directed to a user equipment, and receiving a related traffic flow indication indicative of a second traffic flow related to the first traffic flow and a relative quality of service indication indicative of a relative quality of service criterion corresponding to the first traffic flow and the second traffic flow, wherein the first traffic flow and the second traffic flow correspond to an independent quality of service criterion. The operations may further comprise transmitting, to the user equipment, the first protocol data unit.

In an embodiment, the operations may further comprise determining that a second protocol data unit corresponding to the second traffic flow is available for transmission to the user equipment and transmitting the second protocol data unit to the user equipment according to the independent quality of service criterion. The operations may further comprise analyzing the relative quality of service criterion with respect to the independent quality of service criterion to result in an analyzed relative quality of service criterion. The operations may further comprise determining, based on the analyzed relative quality of service criterion, that transmission, to the user equipment, of the first protocol data unit according to the independent quality of service criterion is threshold likely to fail to satisfy the relative quality of service criterion, to result in a determined relative quality of service criterion. For example, the radio access network node may determine that transmission of the first protocol data unit according to independent quality of service may satisfy the independent quality of service but not satisfy the relative quality of service. The operations may further comprise based on the determined relative quality of service criterion, prioritizing, with respect to the independent quality of service criterion, transmission of the first protocol data unit according to the relative quality of service criterion, wherein the transmitting of the first protocol data unit is performed according to the relative quality of service criterion.

In an embodiment, the operations may further comprise determining that a second protocol data unit corresponding to the second traffic flow is available for transmission to the user equipment and transmitting the second protocol data unit to the user equipment according to the independent quality of service criterion. The operations may further comprise analyzing the relative quality of service criterion with respect to the independent quality of service criterion to result in an analyzed relative quality of service criterion. The operations may further comprise determining, based on the analyzed relative quality of service criterion, that transmission, to the user equipment, of the first protocol data unit according to the independent quality of service criterion is threshold likely to satisfy the relative quality of service criterion, to result in a determined relative quality of service criterion. Based on the determined relative quality of service criterion, the operations may further comprise prioritizing, with respect to the relative quality of service criterion, transmission of the first protocol data unit according to the independent quality of service criterion, wherein the transmitting of the first protocol data unit is performed according to the independent quality of service criterion.

In an embodiment, the operations may further comprise determining that a second protocol data unit corresponding to the second traffic flow is unavailable for transmission to the user equipment and thus the transmitting of the first protocol data unit is performed according to the independent quality of service criterion.

Another example method may comprise transmitting, by a user equipment comprising a processor to a radio access network node, a first protocol data unit corresponding to a first traffic flow, and transmitting, by the user equipment to the radio access network node, a downlink quality of service indication indicative of a quality of service to be applied to a second traffic flow to be transmitted by the radio access network node to the user equipment. The transmission of the second traffic flow to the user equipment may be related to the first traffic flow. The quality of service to be applied to the second traffic flow may be a relative quality of service. The downlink quality of service indication my comprise a relative downlink quality of service indication.

The downlink quality of service indication may further comprise an independent downlink quality of service indication.

The transmitting of the downlink quality of service indication may be associated with the transmitting of the first traffic flow.

The relative downlink quality of service indication may be at least one of: a latency applicable to at least one of the first traffic flow or the second traffic flow, a data rate applicable to at least one of the first traffic flow or the second traffic flow, or a protocol data unit error rate applicable to at least one of the first traffic flow or the second traffic flow.

The downlink quality of service indication may indicate a relative quality of service corresponding to the second traffic flow and the first traffic flow.

The downlink quality of service indication may be transmitted in an uplink control message.

In an embodiment, the example method may further comprise receiving, by the user equipment from the radio access network node, a provisional semipersistent scheduling configuration comprising at least one downlink resource indication indicative of at least one downlink resource usable by the user equipment to receive at least one protocol data unit corresponding to the second traffic flow. The provisional semipersistent scheduling configuration may be referred to as a pending semipersistent scheduling configuration to refer to a semipersistent scheduling occasion that may be pending for use by the user equipment if needed but that may also be used by another user equipment if the occasion is not needed by the user equipment to receive downlink traffic of a related traffic flow. The method may further comprise receiving, by the user equipment from the radio access network node, at least one protocol data unit corresponding to the second traffic flow according to the at least one downlink resource. The user equipment may avoid waiting to receive, from the radio access network node, a grant indication indicative that the at least one downlink resource has been granted to the user equipment to receive the at least one protocol data unit corresponding to the second traffic flow.

In an embodiment, the user equipment may be a first user equipment, and the at least one downlink resource may be usable by a second user equipment during a sharable period (e.g., during a sharable downlink semi-persistent scheduling occasion resource), that excludes transmission, by the radio access network node to the first user equipment, the second traffic flow.

In an embodiment, the at least one downlink resource may comprise at least one of: a frequency resource usable by the user equipment or a time resource usable by the user equipment.

In an embodiment, the provisional semipersistent scheduling configuration may comprise a modulation indication indicative of a modulation scheme usable by the user equipment to receive the second traffic flow.

In an embodiment, the method may further comprise receiving, by the user equipment from an extended reality application, an expected traffic indication indicative that the second traffic flow is expected to be transmitted by the radio access network node responsive to receiving, by the radio access network node, the first protocol data unit corresponding to the first traffic flow.

In another embodiment may comprise a processor configured to transmit, to a radio access network node, a first protocol data unit corresponding to a first traffic flow, and to transmit, to the radio access network node, a downlink quality of service indication indicative of a quality of service to be applied to a second traffic flow to be transmitted by the radio access network node to the user equipment. The transmission of the second traffic flow to the user equipment may be related to the first traffic flow. The quality of service to be applied to the second traffic flow may be a relative quality of service. The downlink quality of service indication may comprise a relative downlink quality of service indication, which corresponds to a relative quality of service criterion in a relative quality of service configuration. The downlink quality of service indication may transmitted with the first protocol data unit.

In an embodiment, the processor may be further configured to receive, from the radio access network node, a provisional semipersistent scheduling configuration comprising at least one downlink resource indication indicative of at least one downlink resource usable by the user equipment to receive at least one protocol data unit corresponding to the second traffic flow. The processor may be further configured to receive, from the radio access network node, at least one protocol data unit corresponding to the second traffic flow according to the at least one downlink resource. The user equipment may avoid waiting to receive, from the radio access network node, a grant indication indicative that the at least one downlink resource has been granted to the user equipment to receive the at least one protocol data unit corresponding to the second traffic flow.

In an embodiment, the processor may be further configured to generate an expected traffic indication indicative that the second traffic flow is expected to be transmitted by the radio access network node responsive to the radio access network node receiving the first protocol data unit.

In yet another embodiment, a non-transitory machine-readable medium, may comprising executable instructions that, when executed by a processor of a user equipment, facilitate performance of operations, comprising based on transmitting, to a radio access network node, and as a result of the radio access network node having received, a downlink quality of service indication indicative of a quality of service to be applied to a traffic flow to be transmitted by the radio access network node to the user equipment, receiving, by the user equipment from the radio access network node, a provisional semipersistent scheduling configuration comprising at least one downlink resource indication indicative of at least one downlink resource usable by the user equipment to receive at least one protocol data unit corresponding to the traffic flow. The operations may further comprise receiving, by the user equipment from the radio access network node, at least one protocol data unit corresponding to the traffic flow according to the at least one downlink resource. The user equipment may avoid waiting to receive, from the radio access network node, a grant indication indicative that the at least one downlink resource has been granted to the user equipment to receive the at least one protocol data unit corresponding to the traffic flow.

In an embodiment, the user equipment may be a first user equipment, and the at least one downlink resource may be usable by a second user equipment during a sharable period that excludes transmission, by the radio access network node to the first user equipment, the traffic flow.

In an embodiment, the at least one downlink resource may comprise at least one of: a frequency resource usable by the user equipment or a time resource usable by the user equipment.

In an embodiment, the provisional semipersistent scheduling configuration may comprise a modulation indication indicative of a modulation scheme usable by the user equipment to receive the traffic flow.

BRIEF DESCRIPTION OF THE DRAWINGS

FIG. 5 illustrates a relative QoS profile configuration.

FIG. 11 illustrates a timing diagram of an example embodiment of receiving a traffic flow using provisionally granted semi-persistent scheduling occasion resources.

FIG. 13 illustrates a block diagram of an example method embodiment.

FIG. 14 illustrates a block diagram of an example radio access network node.

FIG. 15 illustrates a block diagram of an example non-transitory machine-readable medium embodiment.

FIG. 16 illustrates a block diagram of an example method embodiment.

FIG. 17 illustrates a block diagram of an example user equipment.

FIG. 18 illustrates a block diagram of an example non-transitory machine-readable medium embodiment.

DETAILED DESCRIPTION OF THE DRAWINGS

Figure 1:
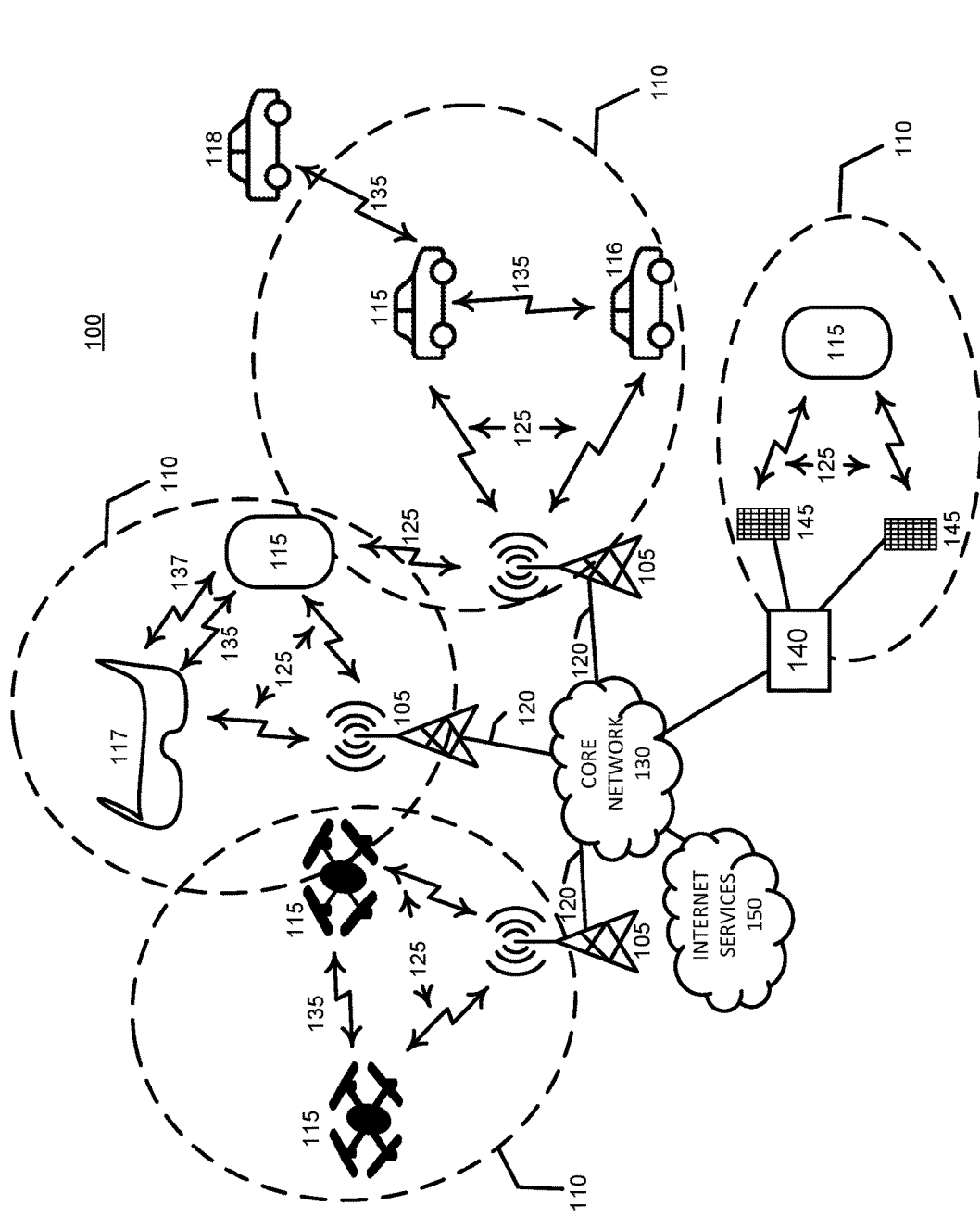
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'extended reality' ("XR") services. XR service may be referred to as anything reality services. XR services may comprise VR applications, which are widely adopted XR applications that provide an immersive environment that can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to a 5 Mbps URLLC link with a 1 ms radio budget, some XR applications need 100 Mbps links with a couple of milliseconds of allowed radio latency. Thus, 5G radio design and associated procedures may be adapted to the new XR QoS class and associated performance targets.

An XR service may be facilitated by traffic having certain characteristics associated with the XR service. For example, XR traffic may typically be periodic with time-varying packet size and packet arrival rate. In addition, different packet traffic flows of a single XR communication session may affect an end user's experience differently. For instance, a smart glass that is streaming 180-degree high-resolution frames may use a large percentage of a broadband service's capacity for fulfilling a user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets, of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at a XR capable device is desirable. Accordingly, a user equipment device accessing XR services, or traffic flows of an XR session, may be associated with certain QoS parameter criterion/ criteria to satisfy performance targets of the XR service. Measured traffic values, or metrics, may correspond to a QoS, or analyzed with respect to, parameter criterion/criteria, such as, for example, a data rate, an end-to-end latency, or a reliability.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic.

Multi-modal XR applications may integrate different technologies to offer a versatile and comprehensive user experience. For example, a multi-modal XR application might use VR to immerse users in a virtual training environment and then seamlessly switch to AR or MR to provide real-time feedback or overlay instructional information corresponding to physical objects that may appear in an environment viewed by an XR user. Such feedback or instructional information may relate to stationary objects or may be information that does not change frequently and may be referred to as stable information.

An advantage of multi-modal XR applications is the adaptability to facilitate different contexts and different user preferences. An XR application can provide varying levels of immersion and interaction, allowing users to choose the most suitable mode of engagement based on the user's needs or the specific task at hand. Additionally, multi-modal XR can enable collaborative experiences, allowing users in different physical locations to interact within the same virtual space.

Uses of multi-modal XR applications extend beyond entertainment and gaming, with widespread adoption in fields such as healthcare, education, engineering, and marketing. Medical practitioners can use multi-modal XR applications to simulate complex surgeries, educators can create interactive and immersive learning experiences, and architects can visualize and modify building designs in real-time.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, laptop computers, tablet computers, automobiles or other vehicles, or drones or other aircraft. Another example of a UE may be a virtual reality/extended reality appliance 117, such as smart glasses, a virtual reality headset, an augmented reality headset, and other similar devices that may provide images, video, audio, touch sensation, taste, or smell sensation to a wearer. A UE, such as XR appliance 117, may transmit or receive wireless signals with a RAN base station 105 via a long-range wireless link 125, or the UE/XR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. XR appliance 117 may also communicate with a wireless UE via a cable, or other wired connection. An XR appliance 117 may offload processing functionality or functionality related to communicating with a RAN, to a user equipment 115, which may be referred to as an intermediate user equipment or an XR processing unit. An XR processing unit or a RAN, or a component thereof, may be implemented by one or more computer components that may be described in reference to FIG. 19.

Continuing with discussion of FIG. 1, base stations 105, which may be referred to as radio access network nodes or cells, may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHZ)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one component carrier, or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHZ to 30 GHZ, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
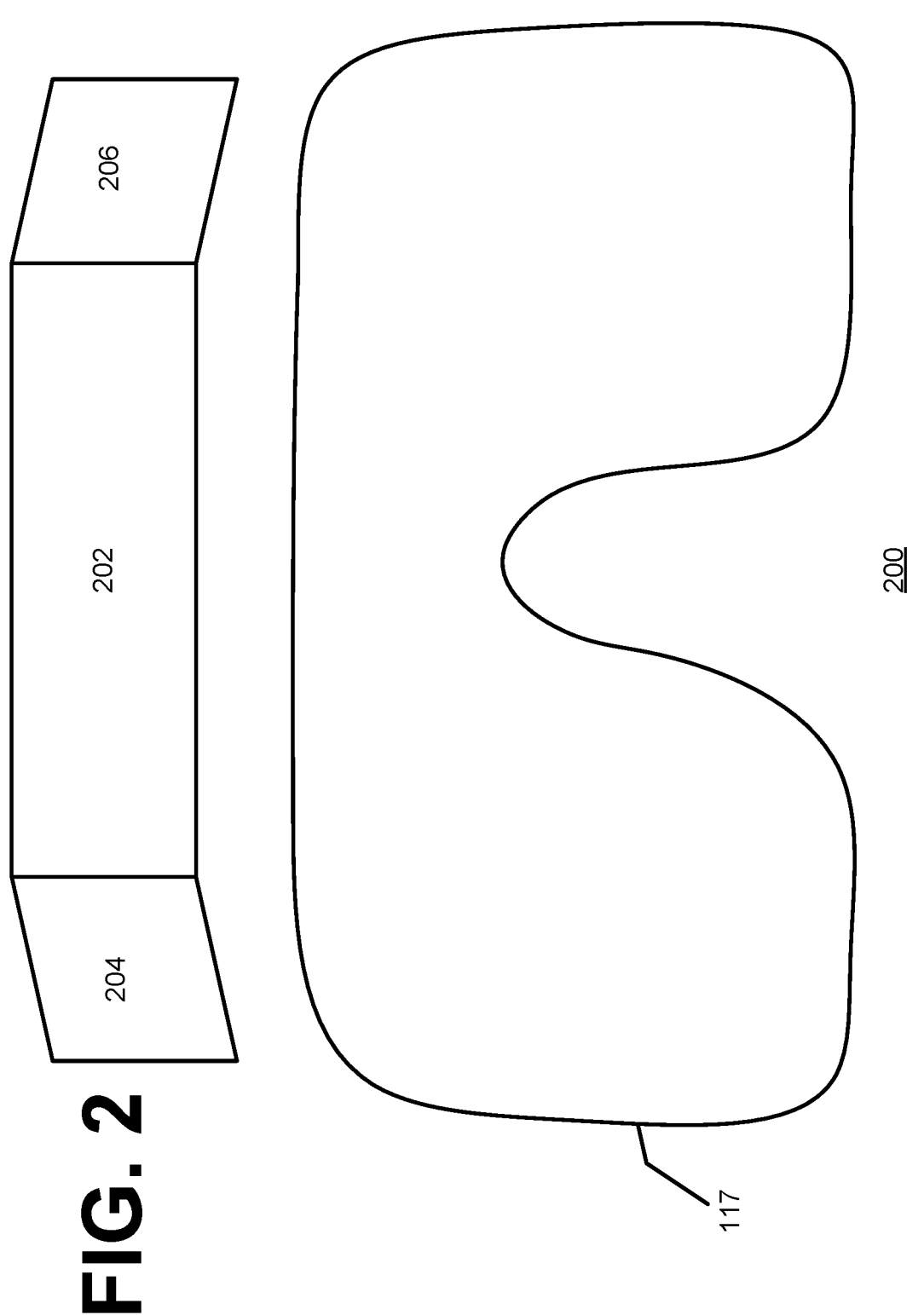
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in the figure, the portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases but unlike for URLLC or eMBB use cases, high-capacity radio links that carry XR data traffic (e.g., data flows that comprise visual information) with stringent radio levels (e.g., latency) and reliability levels are required for a reasonable end user experience. For example, compared to a 5 Mbps URLLC link with a 1 ms radio latency budget, some XR applications require 100 Mbps links with about 2 mS allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5G communication system using NR techniques, method, systems, or devices. For example, a wireless data traffic flow carrying visual information for display on center, or pose, visual display portion 202 may be prioritized higher than a wireless data traffic flow carrying visual information for left visual display portion 204 or for right visual display portion 206.

The performance of a communication network in providing an XR service may be at least partially determined according to satisfaction of a user of the XR services. Each XR-service-using user equipment device may be associated with certain QoS parameter criterion/criteria with respect to which measured values, or metrics, corresponding to traffic flows that facilitate XR service may be analyzed. Adjusting scheduling of traffic such that a measured traffic flow metric satisfies a QoS parameter, such as, for example, a data rate, an end-to-end latency, or a reliability may be beneficial to a user's XR experience.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different Qos classes.

Multi-modal XR may be used in implementations of XR services. Multi-modal XR services may facilitate diverse use cases beyond XR gaming and XR entertainment services. For example, a multi-modal XR service may facilitate an application class for which multiple downlink-downlink or downlink-uplink traffic streams are correlated, or related, to each other. However, conventional techniques do not facilitate relative QoS enforcement between multiple traffic streams that are related. Instead, related traffic streams/flows are treated independently such that only an independent quality of service criterion corresponding to a given stream/flow may be enforced for the given stream/flow. Independent treatment of related traffic flow may result in sluggish and degraded performance of multi-modal XR applications.

A multi-modal XR application class may comprise applications wherein multiple downlink and/or uplink traffic streams, despite serving different XR viewing, control, or pose purposes, may be highly correlated, or highly related, to each other. Each traffic stream/flow may be associated with one or more independent QoS parameter criterion/criteria to be satisfied. However, each stream/flow, in reference to another, related, downlink or uplink traffic streams, may have a practical relative, or related, quality of service. For example, a RAN node should schedule for transmission a packet of a downlink traffic flow within a maximum delay criterion from a time when the RAN node receives a packet corresponding to a packet of a related traffic flow (uplink or downlink) to provide an improved user experience. Satisfactory delivery of a packet of a traffic flow (e.g., for purposes of discussion a target traffic flow) may depend on satisfaction of a relative QoS criterion (e.g., a relative delay, a relative reliability, or a relative data rate) with respect to reception or transmission of a packet of a relative traffic flow instead of being only dependant on satisfaction of an independent criterion corresponding to the target flow itself.

For example, for an educational XR application wherein a virtual object pops up in a user's XR appliance field of view when the user looks at or clicks at an associated real/virtual object in the field of view, a relative quality of service ("rQoS") (e.g., a relative tolerable delay budget) should be satisfied between an uplink traffic flow carrying the indication of the user looking or clicking on the real/virtual object and a respective downlink traffic flow carrying the corresponding virtual object to be popped up. If the delay between the uplink and downlink streams is large the user experience may be severely impacted.

However, conventional techniques do not facilitate relative QoS handling and enforcement. According to conventional QoS techniques, a given traffic flow is treated independently to satisfy the flow's independent, flow-specific QoS parameter criteria regardless of the availability of other traffic flows that are related to the given traffic flow, resulting in lack of support for advanced XR multi-modal applications.

Accordingly, embodiments disclosed herein facilitate dynamic rQoS implementation, application, or enforcement among related downlink-downlink traffic flows or related uplink-downlink traffic flows. In some embodiments, application of an rQoS to related downlink-downlink traffic flows may be provisioned at a RAN node by core network equipment. A core network equipment component may configure a RAN node to adaptively identify and override an independent QoS criterion (e.g., a flow-specific latency criterion) with an rQos criterion, indicated to the RAN node via an indication appended to a downlink packet of a certain target downlink traffic flow, which is to be satisfied in reference to handling by the RAN node of traffic corresponding to a relative, or related, downlink traffic flow. In other embodiments, a user equipment may provision a RAN node to enable dynamic rQoS tracking and enforcement of downlink traffic flows in reference to certain uplink traffic flows. Accordingly, embodiments disclosed herein may facilitate relative QoS treatment and adaptive enforcement for efficient handling of XR multi-modal traffic.

Downlink-Downlink Relative QoS Adaptation

A radio access network node may be configured to dynamically enforce relative QoS policies among multiple downlink traffic streams, which are correlated with, or related to, one another, to facilitate an immersive and multi-dimensional user's XR experience. Core network equipment, for example a user plane function ("UPF") or a session management function ("SMF"), may identify a target independent QoS flow indicator ("QFI"), based on a service type associated with a target downlink traffic flow according to existing QoS handling techniques. However, for multi-modal traffic (e.g., a target downlink traffic flow that is generated by a multi-modal application and that is related to one or more other downlink traffic flows), the core network equipment may identify/determine a relative QoS flow indication identifier corresponding to a traffic flow that is related to the target downlink traffic flow. The core network equipment may determine a relative QoS profile. A relative QoS profile may comprise one or more QoS criterion/criteria corresponding to relative QoS parameters such as, for example, packet delay, packet error rate, packet data rate, and the like. The core network equipment may configure a RAN node to schedule/transmit one or more packets corresponding to the relative traffic flow to satisfy the relative quality of service criterion. Scheduling/transmitting the one or more packets corresponding to the relative traffic flow to satisfy the relative quality of service criterion may be based on transmission by the RAN node to a user equipment of one or more packets of the corresponding target traffic flow. Thus, for example, a maximum allowable delay budget among two correlated/related downlink streams can be dynamically adapted and controlled with respect to real-time XR application needs by the core network dynamically generating and appending relative QoS information to packets, transmitted by the core network towards the RAN node that are directed to a user equipment that is facilitating an XR session. The relative QoS information may comprise a target QFI flow identifier, a relative QFI flow identifier, and a relative QoS profile indication, corresponding to the target flow QFI and the relative flow QFI, indicative of a relative QoS criterion to be satisfied.

The RAN node may receive a packet, which may be referred to as a target packet, associated with a target QFI identifier, from the core network via backhaul links and extract relative QoS information associated with, or appended to, the received packet. On condition of an active related QFI traffic flow (e.g., packets of a related traffic flow are buffered at the RAN node), the RAN node may temporarily override an independent QoS criterion, associated with the traffic flow corresponding to the received target packet, with a relative QoS criterion indicated in the extracted relative QoS information. The RAN node may continue to override the independent target QoS criterion with the relative QoS criterion until the related QFI traffic flow becomes inactive. The RAN node may schedule the received packet according to a relative QoS criterion corresponding to a QoS profile indicated in the extracted relative QoS information and based on transmission of a packet corresponding to the relative, or related, traffic flow such that the relative QoS criterion is satisfied.

Uplink-Downlink Relative QoS Adaptation

A user equipment, on which a multi-modal XR application may be executing, may determine relative QoS information associated with a downlink traffic flow that corresponds to transmission of an uplink packet corresponding to an uplink traffic flow. The user equipment may append the determined relative QoS information to, or as part of, transmission of, the uplink payload. For example, an XR device may transmit uplink packets, or packet groups, along with relative QoS information indicative of a related downlink traffic flow. The relative QoS information may comprise a downlink related QFI identifier indicative of the related downlink traffic flow, and an indication of a relative QoS profile. The indicated relative QoS profile may comprise one or more relative QoS criterion/criteria to be satisfied by transmission of the downlink traffic flow with respect to transmission, by the user equipment, of the uplink packet. Thus, the user equipment may instruct the RAN node in scheduling, in terms of, for example, transmission configurations, modulation, coding, etc., one or more downlink traffic flows that are related to an uplink traffic flow between the user equipment and the radio access network node, and according to actual, real-time needs of the XR application. In an embodiment, provisional sharable downlink semi-persistent scheduling (SPS) for downlink traffic flows may be implemented, wherein multiple defined, periodic occasion resources are configured for the user equipment to potentially receive packets corresponding to related downlink traffic flows. The terminology 'provisional,' 'sharable,' or 'sharably' may refer to SPS downlink occasion resources being granted to the user equipment by the RAN node for use, if needed, in carrying downlink traffic related to an uplink packet transmitted from the user equipment to the RAN node. A provisional, sharable, or sharably-scheduled downlink SPS occasion resource may be thought of as provisionally scheduled in the sense that the occasion resource(s) may be granted, or shared, for use by another user equipment if the SPS occasion resource(s) is/are not used to transmit, to the user equipment, downlink traffic related to an uplink packet received from the user equipment. On condition of adopting sharable provisional SPS, the user equipment on which the multi-modal XR application may be executing may assume, or implicitly determine, activation of a first available SPS resource occasion that satisfies a relative QoS criterion transmitted to the radio access network node without waiting for an explicit activation signaling from the radio access network node indicative that the first available SPS resource occasion has been activated for use by the user equipment. If the user equipment does not transmit an uplink packet along with relative QoS information corresponding to a relative downlink traffic flow related to the uplink packet, the user equipment may assume, or implicitly determine, that the sharable SPS occasion resource has not been used by the radio access network node to transmit to the user equipment one or more downlink packets corresponding to the related downlink traffic flow, and thus the user equipment may avoid monitoring the shareable SPS occasion resource.

Conventional QoS adaptation is flow-specific insofar as a QoS profile corresponding to a traffic flow may comprise an independent QoS criterion that may be satisfied exclusively based on availability conditions, arrival times, and buffering delays associated with the traffic flow to which the QoS profile corresponds. According to embodiments disclosed herein, relative and cross-flow QoS adaptation may be used, wherein a relative QoS criterion, indicated in a relative QoS profile, may be satisfied by scheduling/transmitting, by a RAN node, packets of one traffic flow in reference to a state, an arrival time, or a buffering condition corresponding to another, relative traffic flow. Novel backhaul and radio signaling messages may be used to facilitate cross-traffic-flow QoS adaptation.

Figure 3:
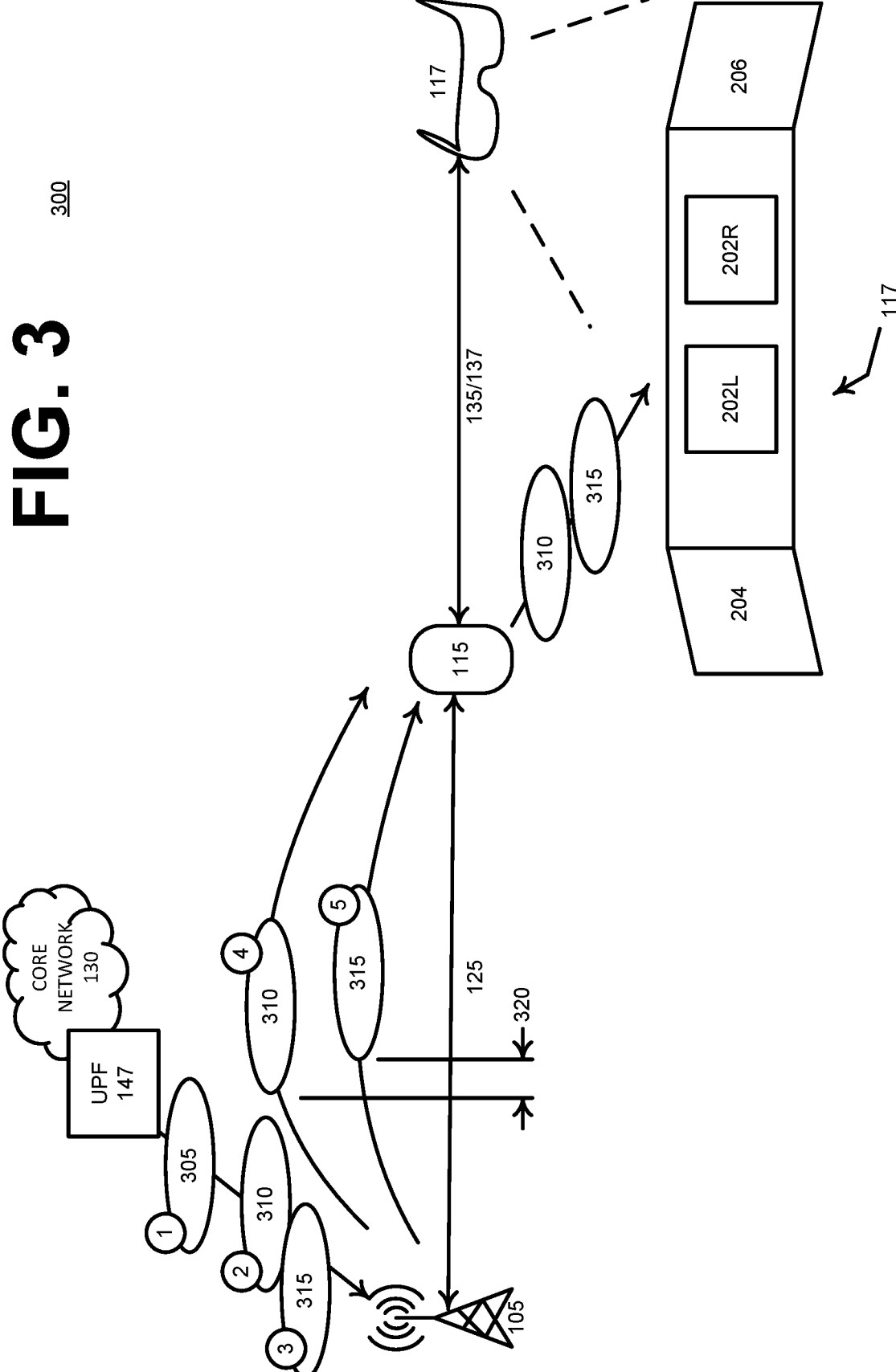
FIG. 3 illustrates an example environment with an anything reality appliance tethered to a user equipment managing related traffic flows.

Turning now to FIG. 3, the figure illustrates an example environment 300 with an anything reality appliance 117 tethered to a user equipment 115. In an embodiment, a downlink traffic flow providing traffic to a peripheral portion 204/206 of VR/XR appliance 117 may be related to a downlink traffic flow carrying traffic to be displayed by a pose portion 202 of the appliance. In another example, two different traffic flows may respectively carry traffic directed to right side 202R and left side 202L of pose portion 202 and thus may be related.

In the embodiment shown in FIG. 3, at act 1, the user plane function 147 of core network 130 may transmit to radio access network node 105 a relative quality of service criterion configuration 305. Configuration 305 may comprise a related traffic flow indication indicative of traffic 310 flow related to traffic flow 315 and a relative quality of service indication indicative of a relative quality of service criterion corresponding to traffic flow 310 and second traffic flow 315. Traffic corresponding to traffic flow 310 may be transmitted from user plane function 147 to radio access network node 105 at act 2 and traffic corresponding to traffic flow 315 may be transmitted at act 3 to the radio access network node. Radio access network node 105 may transmit at least one protocol data unit, such as, for example, a packet, corresponding to traffic flow 310 at act 4 to user equipment 115, and the radio access network node may, at act 5, transmit at least one protocol data unit corresponding to traffic flow 315 to the user equipment. User equipment 115 may be one or more of a smartphone, a tablet, a wireless communication router, a laptop, or other processing unit that may be configured to facilitate communication of extended reality traffic to extended reality appliance 117. User equipment 115 may forward traffic corresponding to traffic flows 310 and 315 to extended reality appliance 117.

One or more protocol data units corresponding to traffic flow 310 may be stored, or buffered, in a buffer, or memory, of radio access network node 105 and may be scheduled for transmission to user equipment 115 according to a quality-of-service criterion corresponding to traffic flow 310. A protocol data unit corresponding to traffic flow 315 may be scheduled for transmission to user equipment 115 according to a relative quality of service criterion that may have been received in, or indicated in, configuration 305. Radio access network node 105 may schedule transmission of a protocol data unit corresponding to traffic flow 315 to satisfy a relative criterion that comprises, for example, an allowable latency, or delay, 320 between transmission of a protocol data unit corresponding to first traffic flow 310 and a protocol data unit corresponding to second traffic flow 315. A protocol data unit corresponding to traffic flow 315 may be scheduled for transmission to satisfy relative criterion 320, which may be more stringent than an independent quality of service criterion that may correspond to traffic flow 315. Thus, transmission of at least one protocol data unit corresponding to second traffic flow 315 may satisfy relative latency flow criterion 320 as well as satisfying an independent scheduling criterion corresponding to a quality of service associated with traffic flow 315. Accordingly, radio access network node 105 may evaluate not only independent qualities of service criterion/criteria respectively corresponding to traffic flow 310 and traffic flow 315, but also a relative quality of service criterion applicable to transmission to user equipment 115 of protocol data units corresponding to traffic flow 315 with respect to transmission of protocol data units corresponding to first traffic flow 310.

Figure 4:
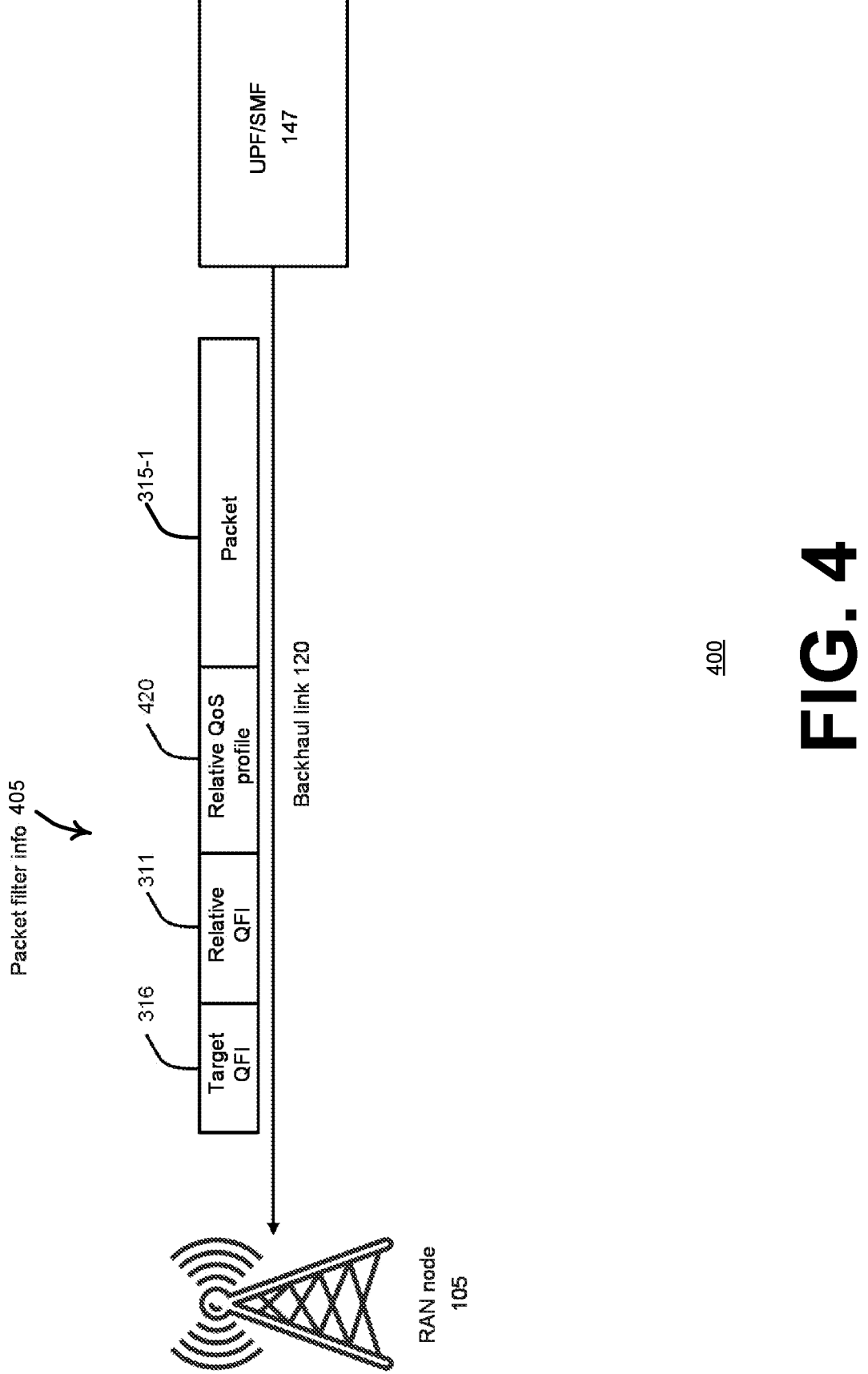
FIG. 4 illustrates an example embodiment to facilitate downlink-downlink relative quality-of-service adaptation to scheduling of protocol data units corresponding to related traffic flows.

Turning now to FIG. 4, the figure illustrates environment 400 with an example embodiment to facilitate downlink-downlink relative quality-of-service adaptation to scheduling of protocol data units corresponding to different, related traffic flows 310 and 315. As shown in FIG. 4, RAN node 105 may receive a downlink packet 315-1, corresponding to traffic flow 315, from core network equipment, such as, for example, a UPF 147, or an SMF, via one or more backhaul interfaces 120. An independent quality criterion associated with traffic flow 315, such as a latency criterion, may correspond to transmission of packets, such as packet 315-1, of traffic flow 315. Packet filter information 405 may be appended to, or otherwise associated with, packet 315-1. Packet filter information 405 and packet 315-1 may be collectively referred to as a composite traffic message. Packet filter information 405 may comprise target QFI identifier, or flow identifier, 316. Flow identifier 316 may be indicative of, and correspond to, flow 315, shown in FIG. 3, to which packet 315-1 corresponds. Providing identifier 316 corresponding to flow 315 may facilitate RAN node 105, upon receiving flow identifier 316, mapping flow 315 to a target independent quality criterion, which may be part of a quality profile, such that scheduling and transmitting of packets corresponding to flow 315 by RAN 105 satisfies the independent criterion corresponding to flow 315.

Packet filter information 405 may comprise relative QFI identifier, or relative flow identifier, 311, which may be referred to as a related traffic flow indication, indicative of a relative traffic flow 310 that is related to traffic flow 315 shown in FIG. 3. Accordingly, RAN 105 is made aware that scheduling and transmission of packets corresponding to traffic flow 315 is to be tied to, based on, related to, or otherwise associated with scheduling and transmission of one or more packets corresponding to traffic flow 310. Packet filter information 405 may comprise a relative quality of service indication 420 indicative of a relative quality, or a relative quality of service, profile to be applied to scheduling and transmitting of traffic packets corresponding to traffic flow 315 with respect to scheduling and transmitting of traffic packets corresponding to traffic flow 310. Accordingly, relative quality indication 420 may correspond to a cross-traffic-flow QoS relationship between traffic flow 315 and traffic flow 310 shown in FIG. 3.

Turning now to FIG. 5, the figure illustrates a relative QoS profile configuration 500. A relative quality of service profile configuration shown in FIG. 5 may comprise information transmitted from UPF 147 to RAN 105 in configuration 305 as shown in FIG. 3. A relative QoS profile field 505 may comprise a QoS profile indication, or index, that corresponds to one or more QoS profiles in fields 510. A quality of service profile may comprise one or more quality of service criterion/criteria to be applied to a protocol data unit corresponding to a target traffic flow, for example traffic flow 315 shown in FIG. 3, that is related to a relative traffic flow, for example traffic flow 310 shown in FIG. 3. Traffic flow 315 and traffic flow 310 may be associated with a target QFI/traffic flow identifier (e.g., identifier 316 shown in FIG. 4) and a relative QFI/traffic flow identifier (e.g., identifier 311 shown in FIG. 4), respectively.

For example, for downlink-downlink relative QoS adaptation/enforcement, a first relative QoS profile may indicate a maximum allowable buffering delay between transmitting packets, or packet groups, corresponding to target traffic flow 315 that is associated with a target QFI identifier 316, and packets, or packet groups, corresponding to relative traffic flow 310 that is associated with relative QFI identifier 311. Thus, for example, a target packet arriving at a RAN node that corresponds to target QFI identifier 316 may be scheduled such that transmission of the target packet relative to a last, or most recent, transmission of a relative packet, or a relative packet group, associated with a related traffic flow that is associated with relative flow QFI identifier 311 does not to violate a maximum relative buffering delay budget/criterion in field 510 associated with a profile identifier 505, which identifier may be indicated in relative quality of service indication 420 shown in FIG. 4.

Thus, scheduling and transmitting of packets of different, but related, traffic flows according to a relative quality of service indicated by a relative quality of service indication 420 may facilitate multi-modal XR applications wherein a user's experience may be impacted if a target downlink flow is received with an excessive delay after the relative downlink flow, but wherein the user's experience may not be impacted, or if impacted only impacted to a de minimis degree, if both traffic flows are delayed a similar amount (e.g., cross-traffic-flow relative delay budget may be more important that absolute delay).

In another example, a relative QoS profile may indicate a target packet error percentile corresponding to a target traffic flow with respect to a relative traffic flow. For example, a reliability-critical traffic flow may have a packet error rate criterion of 10% of a packet error rate associated with a related traffic flow corresponding to a relative QFI identifier. Assuming, in the example, that the related traffic flow is associated with a QFI independent packet error rate of 10% (e.g., 0.1), a dynamically set relative packet error rate associated with transmitting of packets corresponding to the target QFI identifier with respect to transmission of a packet corresponding to the relative QFI identifier becomes 0.01, or 1%.

Figure 6A:
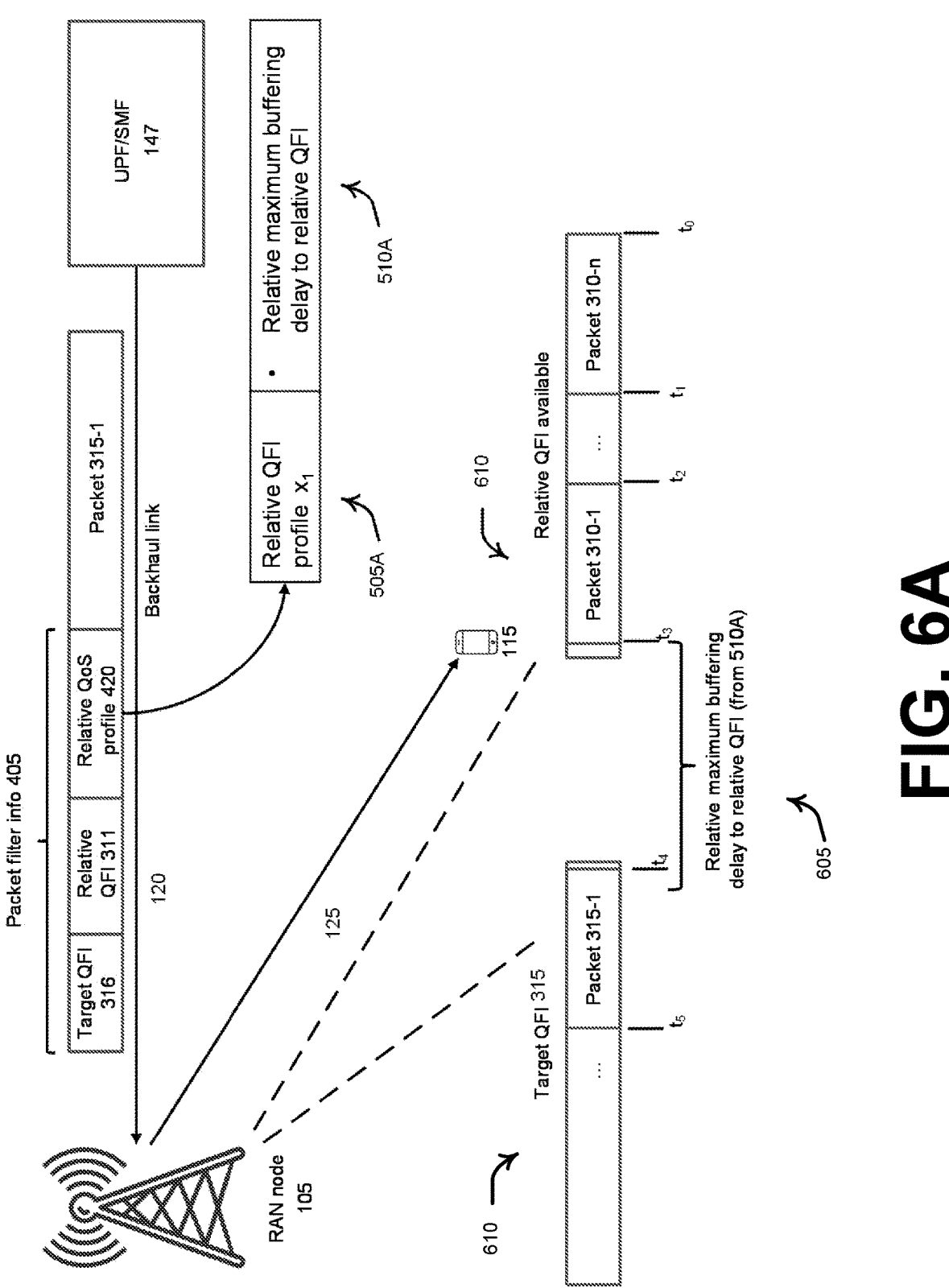
FIG. 6A illustrates an embodiment that applies a downlink-downlink relative traffic flow quality of service criterion to at least one packet.

Turning now FIG. 6A, the figure illustrates an embodiment that applies a downlink-downlink relative traffic flow quality of service criterion to at least one packet 315-1 that corresponds to traffic flow 315 as shown in FIG. 3. RAN node 105 may receive packet 315-1 from core network equipment, for example UPF 147. Relative quality information may be appended to packet 315-1 as part of packet filter information 405. RAN node 105 may extract target quality flow identifier 316, relative quality flow identifier 311, and associated relative QoS profile indication 420 from packet filter information 405. RAN node 105 may determine a relative QoS criterion to be applied to scheduling or transmitting of protocol data unit 315-1 corresponding to QFI identifier 316 and to scheduling or transmitting of protocol data units 310-1 . . . 310-n corresponding to relative downlink QFI identifier 311. In the illustrated example, the indicated QoS criterion may be an allowable maximum buffering delay 605 between the transmission (e.g., $t_3$) of most recently received/scheduled/transmitted packet 310-1 and the transmission of packet 315-1 at $t_4$. Thus, on condition of availability of protocol data units (e.g., packets) corresponding to traffic flow 310 associated with QFI identifier 311 being stored in buffer 610 of RAN 105, RAN node 105 may temporarily override an independent QoS criterion (e.g., a latency budget) corresponding to packets corresponding to traffic flow 315 with a relative quality of service criterion indicated by indication 420 (e.g., indication 420 may comprise a profile index/indication '$x_1$' that refers to field 505A that is associated with relative quality of service criterion/criteria contained in field 510A in configuration information 500 shown in FIG. 5). Accordingly, RAN node 105 may prioritize transmission of received packet 315-1 by scheduling transmission of packet 315-1 according to the relative quality of service criterion instead of according to the independent quality of service criterion to avoid violating a maximum allowable delay, contained in field 510A shown in FIG. 5, between transmission of packet 315-1 and the last (dynamically scheduled) packet 310-1 corresponding to relative QFI identifier 311.

As shown in FIG. 6A, relative flow packets 310-n . . . 310-1 to the right in buffer 610 may be transmitted to RAN 105 between time to and time $t_3$, and packet 315-1 to the left in buffer 610 may be scheduled and transmitted to the RAN beginning at $t_4$, which is within the indicated relative latency budget 605 based on the time $t_3$ by which packets 310-n . . . 310-1 have been transmitted. Conventionally, a packet is associated with an independent latency budget, associated with a traffic flow corresponding to the packet, that is to be satisfied, wherein a reference time for such latency budget (e.g., a time from which the packet must be transmitted to satisfy the independent latency budget), or delay, is the time the packet entered a buffer of the RAN node. In contrast, in the embodiment shown in FIG. 6A, the time reference, with respect to which transmitting of packet 315-1 is to be based, is time $t_3$ when packet(s) 310-n . . . 310-1 is/are transmitted. Thus, RAN 105 may reference transmitting of packet(s) 310-n-310-1 in determining scheduling/transmitting of target packet 315-1. It will be appreciated that reference time $t_3$ is shown for purposes of illustration but that a time other than time $t_3$, for example time to, time $t_1$, or time $t_2$ could be the time reference with respect to which packet 315-1 is to be scheduled for transmission.

Figure 6B:
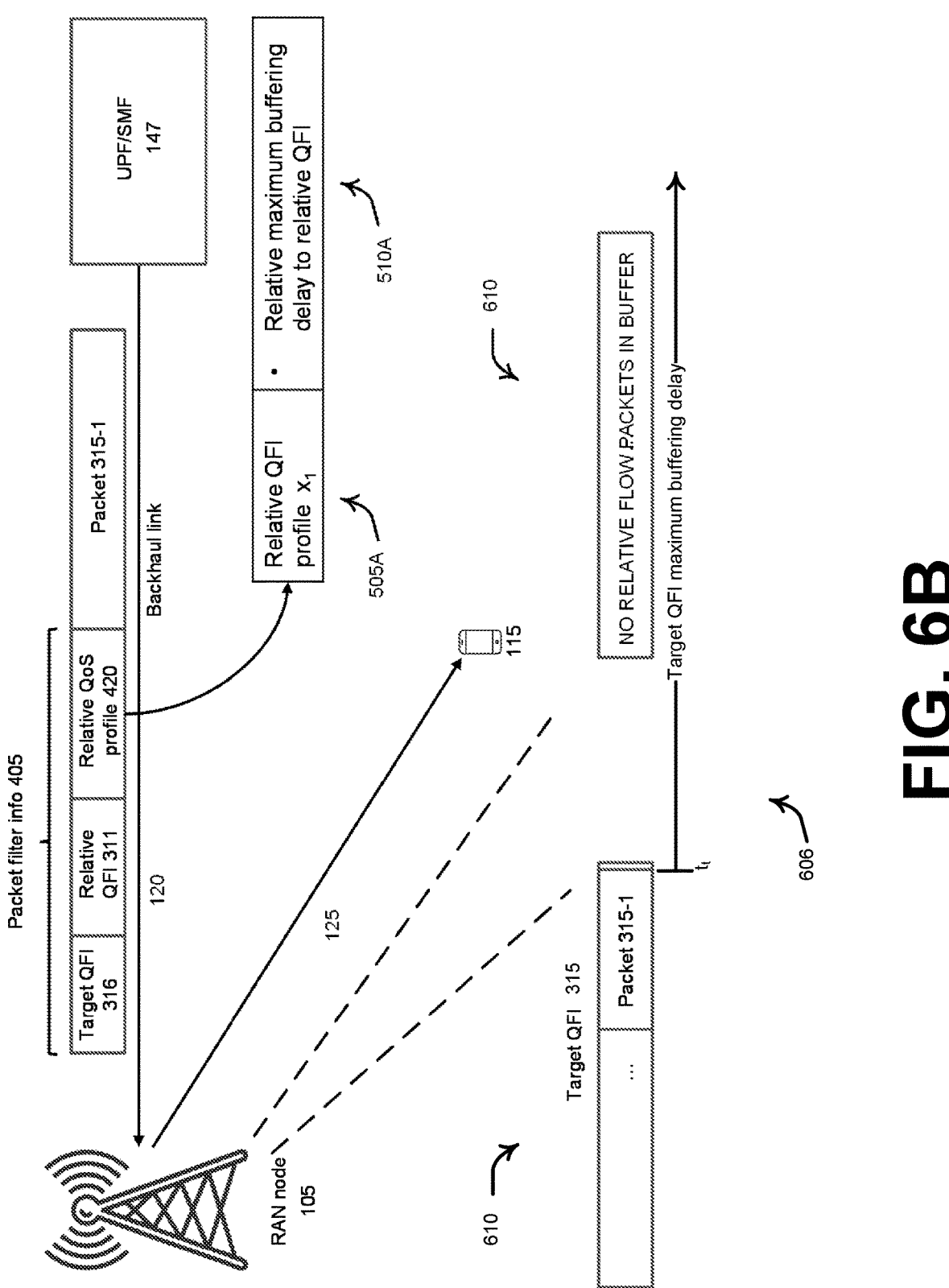
FIG. 6B illustrates an embodiment to disregard a received relative quality of service criterion.

Turning now to FIG. 6B, the figure illustrates a case with no buffered packets corresponding to QFI flow identifier 311 in buffer 610 of RAN 105 (e.g., relative QFI flow 310 shown in FIG. 3 corresponding to QFI identifier 311 is currently inactive). Accordingly, RAN node 105 may discard, or disregard, received relative QoS information 420 and prioritize scheduling of the received packet 315-1 for transmission at $t_t$ according to an independent quality criterion (e.g., buffering delay budget 606) corresponding to flow 315.

Figure 7:
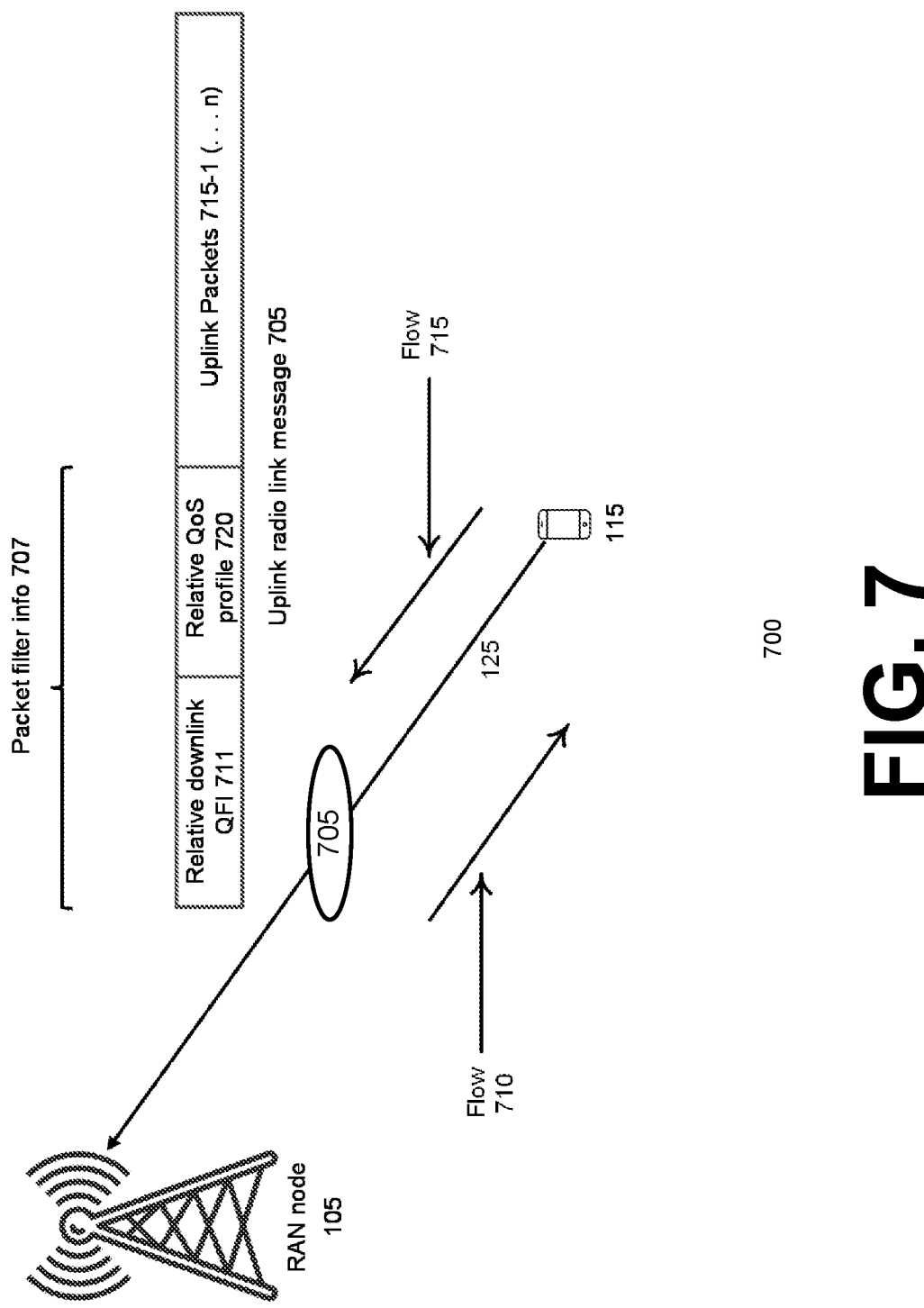
FIG. 7 illustrates an example embodiment to facilitate applying a relative quality of service to a downlink traffic flow that is related to an uplink traffic flow.

Turning now to FIG. 7, the figure illustrates an example embodiment to facilitate relative QoS handling for related uplink-downlink traffic flows. Relative QoS configuration information 707, which may be referred to as packet filtering information, may be generated at user equipment 115, on which a multi-modal XR application may be executing. UE 115 may transmit configuration information 707 to serving RAN node 105 to dynamically cause the RAN node to implement scheduling of protocol data units corresponding to relative downlink traffic flow 710. Information 707 may be transmitted in association with uplink protocol data unit 715-1 as part of composite uplink message 705. UE 115 may determine that downlink traffic flow 710 is related to uplink traffic flow 715. Packet filtering information 707 may indicate related downlink traffic flow 710, related to uplink traffic flow 715, with relative QFI identifier 711. Thus, UE 115 running the XR application may determine a relative QoS criterion to be applied to scheduling/transmitting of packets corresponding to relative downlink traffic flow 710, which the user equipment may determine should be received in response to transmission of at least one packet corresponding to uplink traffic flow 715. In an embodiment, user equipment 115 may append to packet 715-1 relative QFI identifier 711 indicative of downlink traffic flow 710 determined by the user equipment to be related to uplink traffic flow 715. User equipment 115 may append to packet 715-1 downlink quality of service indication 720 indicative of a relative quality of service to be applied to packets corresponding to related traffic flow 710 that is to be transmitted by radio access network node 105 to user equipment 115. Downlink quality of service indication 720 may be indicative of relative QoS profile information, or a relative quality of service profile, that may comprise a relative QoS criterion to be applied to transmitting of packets, corresponding to relative traffic flow 710, that are related to uplink traffic flow 715.

Figure 8:
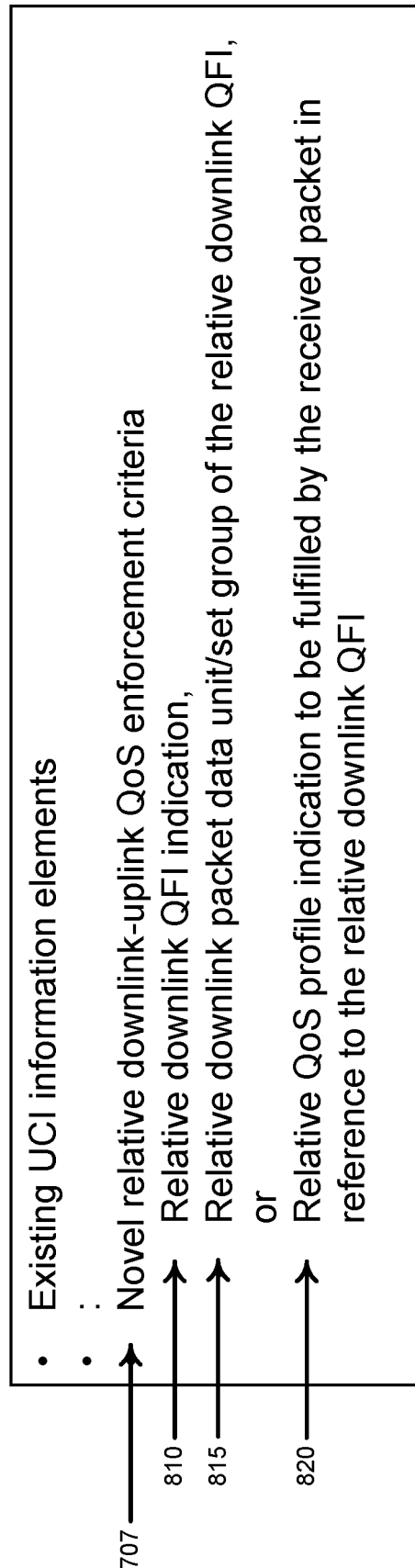
FIG. 8 illustrates an example uplink control channel information message comprising relative quality of service configuration information.

Turning now to FIG. 8, the figure illustrates an example uplink control channel information ("UCI") message 800 comprising configuration information 707 as described in reference to FIG. 7. UCI message 800 may be transmitted according to uplink control information message signaling via uplink control channel resources established between UE 115 and RAN node 105. Message 800 may comprise relative downlink QFI identifier 810. QFI identifier 810 may correspond to, or indicate, downlink traffic flow 710 (as shown in FIG. 7), which may be related to uplink traffic flow 715 shown in FIG. 7. Continuing with description of FIG. 8, message 800 may comprise relative downlink packet indication 815 indictive of at least one protocol data unit, such as a packet of packet group, corresponding to downlink flow 710 indicated by QFI indicator 810. Message 800 may comprise relative QoS profile index/indication 820, which may be indicative of a relative quality of service criterion to be applied to scheduling or transmission of at least one protocol data unit corresponding to related traffic flow 710 indicated by QFI indication 810, wherein the relative quality of service criterion is to be applied to scheduling or transmission of the relative protocol data unit with respect to transmission of a protocol data unit corresponding to an uplink traffic flow transmitted to a radio access network node by a user equipment (e.g., traffic flow 715 shown in FIG. 7 transmitted by UE 115 to RAN node 105). A relative quality of service profile indicated by relative QoS profile index/indication 820 may have been received by the radio access network node before the user equipment transmits message 800 to the radio access network node.

Figure 9:
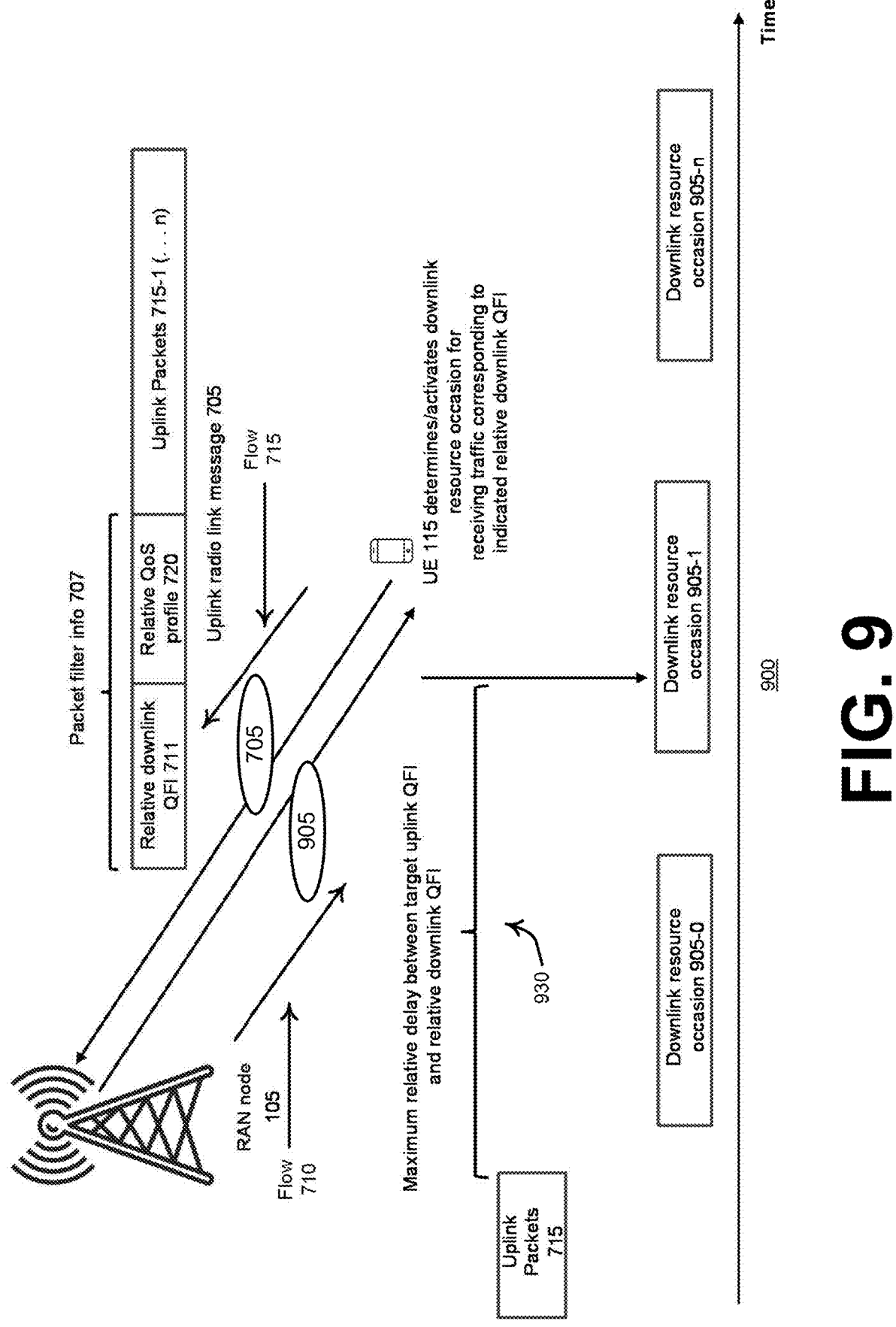
FIG. 9 illustrates an example embodiment to facilitate uplink-downlink relative quality of service criterion adaptation.

Turning now to FIG. 9, the figure illustrates an embodiment to facilitate uplink-downlink relative quality of service criterion adaptation. User equipment 115, on which an XR application may be executing, may generate relative quality of service information 707, which may be referred to as packet filtering information, corresponding to one or more downlink traffic flows (e.g., downlink traffic flow 710 shown in FIG. 7) that may be related to an uplink traffic flow (e.g., traffic flow 715 shown in FIG. 7). As described in reference to FIG. 7, user equipment 115 may append relative quality of service information 707 to a packet corresponding to an uplink traffic flow between the user equipment and a serving RAN node. In an embodiment, the user equipment may transmit the packet and relative quality of service information in an uplink message, such as, for example, message 705 described in reference to FIG. 7. In an embodiment, the user equipment may transmit the relative quality of service information in an uplink control channel message, such as, for example, message 800 described in reference to FIG. 8. Continuing with description of FIG. 9, on condition of adopting downlink semi persistent scheduling ("SPS") by RAN node 105, RAN node 105 may configure, via provisional semipersistent scheduling configuration 905, UE 115 with multiple resource occasions 905-0 . . . 905-n, as occasions that may potentially by used by the user equipment to receive available downlink traffic streams/flows. SPS resource occasions 905-0 . . . 905-n may be referred to as sharably scheduled downlink resource(s).

According to conventional techniques, user equipment devices wake up for each of configured SPS since, according to conventional SPS techniques, user equipment 115 would not be aware if there is downlink traffic that has been transmitted to the user equipment via a configured SPS occasion. Waking up for a configured SPS occasion by a user equipment to check whether traffic has been transmitted to the user equipment via the SPS occasion may result in severe degradation of a user equipment's battery due to energy consumed to check an SPS occasion only to determine that downlink traffic was not transmitted to the user equipment via the SPS resource occasion.

Using the embodiment illustrated in FIG. 9, user equipment 115 may determine that one or more downlink traffic flows 710 are highly correlated, or related, to an uplink traffic flow packet 715-1 transmitted to RAN 105 by the user equipment transmission based on, for example, the downlink traffic flow(s) and uplink traffic flow 715 corresponding to an XR session being facilitated by the user equipment. Thus, for example, UE 115 may determine a first available SPS resource occasion 905-0 or 905-1 to use to receive downlink traffic corresponding to flow 710, indicated by UE 115 in packet filter information in message 800 as being related to uplink traffic flow 715. User equipment 115 may determine SPS resource occasion 905-0 or 905-1 based on the SPS resource occasion occurring within a relative quality criterion 930, such as a criterion indicated by indication 820 described in reference to FIG. 8 (e.g., a cross uplink-downlink traffic delay budget determined by an XR application executing on user equipment 115 and transmitted to RAN node 105 via a message 705). User equipment 115 may assume (e.g., implicitly determine) activation of the determined one or more SPS resource occasions 905-0 or 905-1 based on transmitting to RAN node 105 the relative quality information 707 in a message 705 without waiting to receive from the RAN node a grant message that indicates that occasions 905-0 or 905-1 have been granted to user equipment 115 to receive traffic corresponding to related downlink traffic flow 710. Accordingly, user equipment 115 may attempt receiving traffic corresponding to relative downlink QFI flow 710 via SPS occasions 905-0 or 905-1 that RAN 105 is presumed, by UE 115, to have allocated for transmission of packets corresponding to flow 710 to user equipment 115 based on the RAN node having received relative Qos information 707 from the user equipment along with the RAN node receiving uplink traffic (e.g., packet 715-1) corresponding to uplink traffic flow 715. Thus, using the embodiment described in reference to FIG. 9 may lead to energy saving at user equipment 115 due to the user equipment only waking up to receive downlink traffic 710 during occasions 905-0 or 905-1. Using the embodiment described in reference to FIG. 9 may lead to a reduction of SPS control overhead because RAN node 105 may avoid notifying, via dedicated control signaling, user equipment 115 when downlink traffic directed to the user equipment is available for transmission thereto at the RAN node, of the granting of SPS occasions 905-0 or 905-1. Furthermore, since each SPS resource occasion 905-2 . . . 905-n may not necessarily be used to transmit downlink traffic 710 to user equipment 115 (in the example, occasion(s) 905-0 or 905-1 may be used to transmit traffic to UE 115), SPS resource occasions other than 905-0 or 905-1 may be used to transmit downlink traffic that corresponds to traffic flows other than traffic flow 710.

Figure 10:
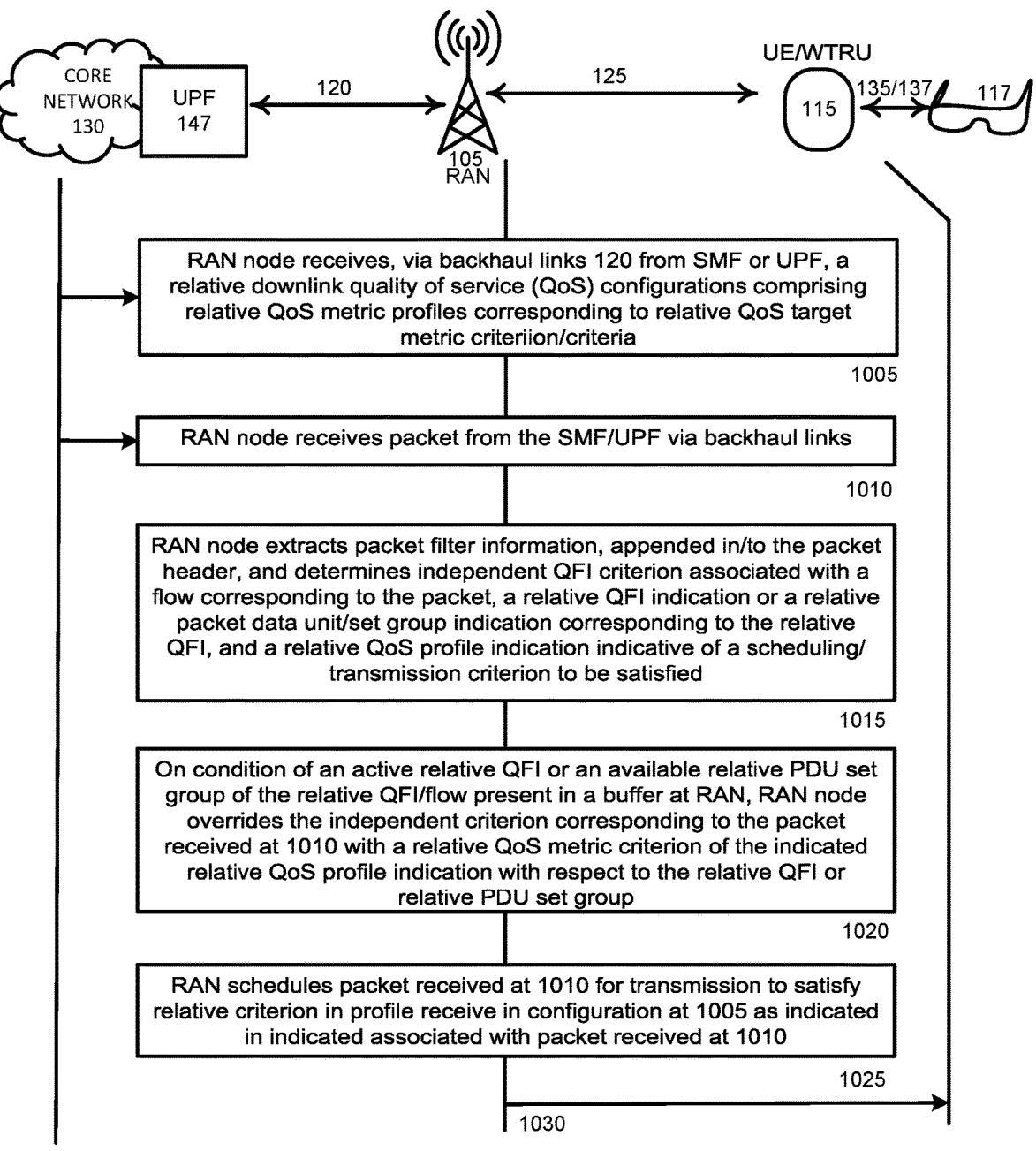
FIG. 10 illustrates a timing diagram of an example embodiment of applying a quality of service to a relative traffic flow at a radio access network node.

Turning now to FIG. 10, the figure illustrates a timing diagram of an example method 1000 to apply a relative quality of service criterion to a protocol data unit corresponding to a target traffic flow that is related to a related traffic flow. At act 1005, RAN node 105 may receive, via backhaul link(s) 120, from the session management function or user plane function 147, a relative downlink quality of service configuration (e.g., configuration 305 shown in FIG. 3). The configuration received at act 1005 may include a list of relative QoS metric profile identifiers, which may be referred to as indications or indices, (e.g., included in field 505 shown in FIG. 5) and relative QoS criterion/criteria, associated with respective corresponding identifiers (e.g., criterion information included in field 510 is associated with respective identifiers in field 505 shown in FIG. 5). At act 1010, RAN node 105 may receive a packet from UPF 147 via backhaul link(s) 120. At act 1015, RAN node 105 may extract packet filter information, which may be appended to a header of the packet received at act 1010. Extracted packet filter information may comprise a QFI indication corresponding to the packet received at act 1010 and a relative QFI indication indicative of a relative traffic flow related to a traffic flow corresponding to the packet received at act 1010 (or the RAN node may determine relative protocol data unit/set group identifier(s) corresponding to the relative QFI traffic flow). Packet filter information extracted at act 1015 may comprise a relative QoS profile indication indicative of a relative quality of service criterion, with respect to which scheduling or transmitting of the packet received at act 1010 relative to a packet, or protocol data unit, corresponding to the relative traffic flow is to satisfy. On condition of one or more packets, or protocol data units, corresponding to an active relative QFI traffic flow being buffered at RAN node 105, the RAN node at act 1020 may override an independent criterion corresponding to the packet received at act 1010 with a relative quality of service criterion indicated in the packet filter information extracted at act 1015. At act 1025, RAN node 105 may schedule for transmission the packet received at act 1010 according to the relative quality of service criterion instead of according to the independent quality of service criterion. At act 1030, RAN node 105 may transmit to user equipment 115 the scheduled packet received at act 1010 according to the relative quality of service criterion based on a transmission time at which a packet, or protocol data unit, corresponding to the relative traffic flow, was transmitted by the RAN node to the user equipment.

Turning now to FIG. 11, the figure illustrates a timing diagram of an example embodiment method 1100 to apply a relative quality of service criterion to a protocol data unit corresponding to a downlink traffic flow that is related to an uplink traffic flow. At act 1105, UE/WTRU 115, during an active extended reality session with respect to XR appliance 117, may transmit an uplink XR traffic packet to RAN node 105. The uplink packet transmitted at act 1105 may comprise packet-specific relative QoS information appended to the packet, such as, for example, as a MAC CE or as an independent uplink control signaling message. The packet-specific relative QoS information (e.g., information 707 shown in FIG. 9 may be transmitted at act 1105 via message 705 shown in FIG. 9) may comprise a relative downlink traffic flow QFI indication associated with a packet, a protocol data unit, or protocol data unit group, corresponding to a downlink QFI traffic flow. The packet-specific relative QoS information may comprise an indication indicative of a downlink packet, protocol data unit, or protocol data unit group corresponding to a downlink traffic flow corresponding to the downlink QFI flow indication and that is related to an uplink traffic flow corresponding to the uplink XR traffic packet. The packet-specific relative QoS information may comprise a relative QoS profile indication indicative of a downlink quality of service criterion to be applied to scheduling or transmission, by RAN 105, of at least one packet, corresponding to the downlink QFI traffic flow indicated by the downlink QFI flow indication, with respect to transmitting, by user equipment 115, an uplink XR traffic packet.

At act 1110, RAN node 105 may determine, and transmit to user equipment 115, sharably scheduled downlink resource(s) configuration information (e.g., configuration information 905 shown in FIG. 9) indicative of SPS occasion resources that may be usable by the user equipment to receive protocol data units corresponding to the relative downlink traffic flow.

On condition of sharably scheduled semi-persistent scheduled downlink occasion resources being configured at user equipment 115, WTRU/UE 115 may determine at act 1115 a soonest at least one sharably scheduled downlink occasion resource according to which transmission of a downlink traffic flow packet corresponding to the downlink QFI traffic flow indicated at act 1105 would satisfy the relative quality of service criterion indicated at act 1105 with respect to transmission of the uplink XR traffic packet at act 1105. At act 1120, UE/WTRU 115 may receive and decode a downlink packet, or protocol data unit/group, corresponding to the of the relative QFI downlink traffic flow, indicated to RAN node 105 at act 1105, via the determined soonest at least one sharable downlink occasion resource that satisfies the relative quality of service criterion corresponding to the relative QoS profile indicated in the packet filter information transmitted to RAN node 105 at act 1105. The soonest resource may be a resource overlapping, or a time-nearest available downlink resource occasion with respect to, a transmission time of the uplink XR traffic packet transmitted at act 1105 that satisfies the required relative QoS criterion, for example a maximum delay, corresponding to the related uplink and downlink QFI flows. It will be appreciated that a downlink-downlink relative quality of service criterion described in reference to FIG. 10, or an uplink-downlink relative quality of service criterion may comprise a described in reference to FIG. 11, may comprise a latency/delay criterion, a modulation criterion, or a frequency resource criterion.

Figure 12:
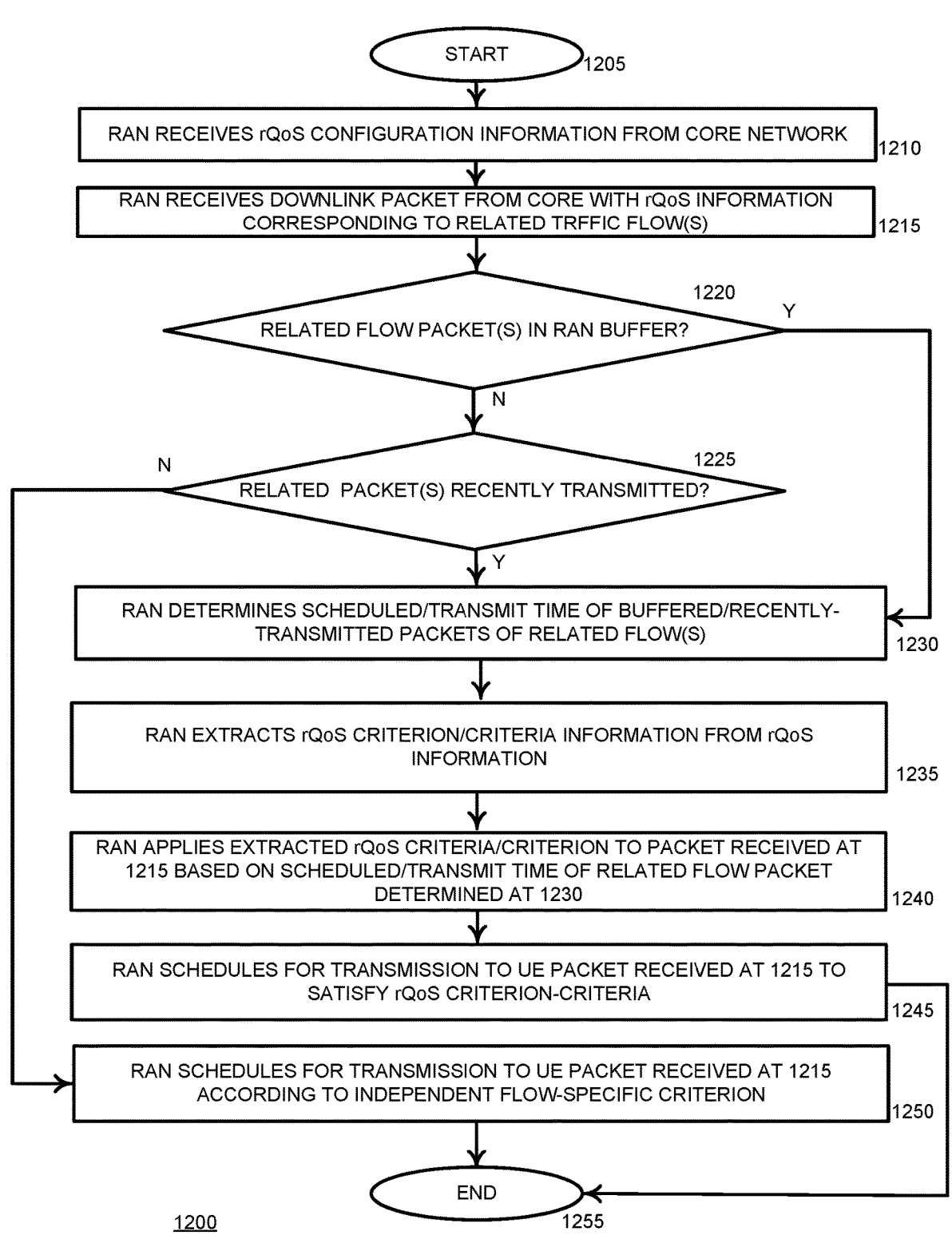
FIG. 12 illustrates a flow diagram of an example embodiment method of facilitating applying a relative quality of service to a related traffic flow.

Turning now to FIG. 12, the figure illustrates a flow diagram of an example embodiment 1200. Method 1200 begins at act 1205. At act 1210, a radio access network node may receive relative quality of service configuration information from core network equipment, for example a user plane function or a session management function. The relative quality of service configuration information may comprise information 305 described in reference to FIG. 3, or information shown in configuration 500 described in reference to FIG. 5. Continuing with description of FIG. 12, at act 1215 the radio access network node may receive from core network equipment a downlink packet corresponding to a first traffic flow. The downlink packet may be received along with relative quality of service information in a composite message. The relative quality of service information may comprise packet filtering information, for example packet filtering information 405 described in reference to FIG. 4. The packet filtering information may comprise a traffic flow identifier associated with the first traffic flow, a related traffic flow identifier associated with a second traffic flow that is related to the first traffic flow, or a relative quality of service criterion corresponding to the first traffic flow and the second traffic flow. The relative quality of service criterion may be used by the radio access network node to schedule transmission of downlink packets corresponding to the second traffic flow. The traffic flow identifier associated with the first traffic flow may comprise a first quality of service flow indicator corresponding to a first quality of service associated with the first traffic flow. The traffic flow identifier associated with the second traffic flow may comprise a second quality of service flow indicator corresponding to a second quality of service associated with the second traffic flow. The second traffic flow may be referred to as a related, or relative, traffic flow insofar as transmission of the second traffic flow may be related to transmission of the first traffic flow for purposes of providing, or improving, a user's experience using an extended reality appliance to which the first traffic flow and the second traffic flow are directed.

At act 1220, the radio access network node may determine whether one or more packets corresponding to the related traffic flow are stored in a scheduling buffer corresponding to the radio access network node. If a determination is made at act 1220 that one or more packets corresponding to the related traffic flow are stored in the scheduling buffer, method 1200 advances to act 1230. Returning to description of 1220, if a determination is made that one or more packets corresponding to the related traffic flow are not stored in the scheduling buffer, method 1200 advances to act 1225. At act 1225, the radio access network node may determine whether one or more packets corresponding to the related traffic flow have been recently transmitted. For example, if one or more packets corresponding to the related traffic flow have been transmitted to a user equipment such that that transmission of the packet received in the composite message at act 1215 could satisfy a relative quality of service criterion indicated in the relative quality of service information received in the composite message, the radio access network node may at act 1230 schedule the packet received at act 1215 in the composite message such that the relative quality of service criterion is satisfied. If a determination is made at act 1225 that one or more packets corresponding to the related traffic flow have not been recently transmitted to the user equipment, method 1200 advances to act 1250. At act 1250, the radio access network node may schedule the packet received in the composite message at act 1215 according to an independent quality of service criterion corresponding to the first traffic flow indicated by the first quality of service flow indication. Method 1200 advances from act 1250 to act 1255 and ends.

Returning to description of act 1230, regardless of whether a determination is made at act 1220 that one or more packets corresponding to the related traffic flow are stored, or buffered, in a buffer at the radio access network node or whether a determination is made at act 1225 that a packet corresponding to the related traffic flow was recently transmitted to the user equipment, the radio access network node may determine a scheduled time of a buffered packet corresponding to the related traffic flow or a transmit time that a packet corresponding to the related traffic flow was transmitted, respectively. At act 1235, the radio access network node may extract a relative quality of service criterion/criterion from the relative quality of service information received in the composite message at act 1215. Based on the scheduled time or transmit time of a packet corresponding to the related traffic flow determined at act 1230, at act 1240 the radio network node may apply the relative quality of service criterion/criteria extracted at act 1235 to the packet received at act 1215 such that transmission of the packet received at act 1215 satisfies the relative quality of service criterion/criteria extracted at act 1235 from the composite message received at act 1215. For example, as shown and described in reference to FIG. 6A, if a determination is made at act 1220 that a packet corresponding to the related traffic flow is stored in buffer 610 of the radio access network node, and a determination is made at act 1230 that the packet corresponding to the related traffic flow is scheduled to be transmitted from the buffer at time t₃, the radio access network node may, at act 1240, determine a time for transmission of the packet received at act 1215 (e.g., packet 315-1 shown in FIG. 6A) from buffer 610 shown in FIG. 6A at time t₄, or another time to satisfy the relative quality of service criterion/criteria extracted at act 1235, which relative quality of service criterion/criteria may be represented by the maximum buffering delay 605 shown in FIG. 6A. At act 1245, the radio access network node may schedule the packet received at act 1215 for transmission to a user equipment, to which the packet received at act 1215 is directed, based on the applying of the relative quality of service criterion/criteria at act 1240 to the packet received at act 1215. Method 1200 advances from act 1245 to act 1255 and ends. It will be appreciated that scheduling and transmission at act 1250 of the packet received at act 1215 according to the independent flow specific criterion corresponding to the first traffic flow may correspond to the embodiment shown and described in reference to FIG. 6B.

Turning now to FIG. 13, the figure illustrates an example embodiment method 1300 comprising at block 1305 facilitating, by a radio access network node comprising a processor, receiving a first protocol data unit corresponding to a first traffic flow; at block 1310 facilitating, by the radio access network node, receiving quality information associated with the first protocol data unit, wherein the quality information comprises a related traffic flow indication indicative of a second traffic flow related to the first traffic flow and a relative quality of service indication indicative of a relative quality of service criterion corresponding to the first traffic flow and the second traffic flow; at block 1315 facilitating, by the radio access network node, transmitting, to a user equipment, a second protocol data unit corresponding to the second traffic flow; at block 1320 facilitating, by the radio access network node, transmitting, to the user equipment, the first protocol data unit according to the relative quality of service criterion; and at block 1325 wherein the first protocol data unit and the quality information associated with the first protocol data unit are received via a backhaul communication link as part of a composite traffic message corresponding to the first traffic flow.

Turning now to FIG. 14, the figure illustrates an example radio access network node, comprising at block 1405 a processor configured to receive a composite traffic message corresponding to a first traffic flow, wherein the composite traffic message comprises a first packet corresponding to a first traffic flow and quality information associated with the first packet, wherein the quality information comprises a related traffic flow indication indicative of a second traffic flow related to the first traffic flow and a relative quality of service indication indicative of a relative quality of service criterion corresponding to the first traffic flow and the second traffic flow; at block 1410 transmit, to a user equipment, a second packet corresponding to the second traffic flow; at block 1415 transmit, to the user equipment, the first packet according to the relative quality of service criterion; and at block 1420 wherein the first packet is transmitted, according to the relative quality of service criterion, based on the transmitting of the second packet to the user equipment.

Turning now to FIG. 15, the figure illustrates a non-transitory machine-readable medium 1500 comprising at block 1505 executable instructions that, when executed by a processor of a radio access network node, facilitate performance of operations, comprising: receiving a first protocol data unit corresponding to a first traffic flow directed to a user equipment; at block 1510 receiving a related traffic flow indication indicative of a second traffic flow related to the first traffic flow and a relative quality of service indication indicative of a relative quality of service criterion corresponding to the first traffic flow and the second traffic flow, wherein the first traffic flow and the second traffic flow correspond to an independent quality of service criterion; at block 1515 transmitting, to the user equipment, the first protocol data unit; at block 1520 determining that a second protocol data unit corresponding to the second traffic flow is available for transmission to the user equipment; at block 1525 transmitting the second protocol data unit to the user equipment according to the independent quality of service criterion; at block 1530 analyzing the relative quality of service criterion with respect to the independent quality of service criterion to result in an analyzed relative quality of service criterion; at block 1535 determining, based on the analyzed relative quality of service criterion, that transmission, to the user equipment, of the first protocol data unit according to the independent quality of service criterion is threshold likely to fail to satisfy the relative quality of service criterion, to result in a determined relative quality of service criterion; at block 1540 based on the determined relative quality of service criterion, prioritizing, with respect to the independent quality of service criterion, transmission of the first protocol data unit according to the relative quality of service criterion; and at block 1545 wherein the transmitting of the first protocol data unit is performed according to the relative quality of service criterion.

Turning now to FIG. 16, the figure illustrates an example embodiment method 1600 comprising at block 1605 transmitting, by a user equipment comprising a processor to a radio access network node, a first protocol data unit corresponding to a first traffic flow; at block 1610 transmitting, by the user equipment to the radio access network node, a downlink quality of service indication indicative of a quality of service to be applied to a second traffic flow to be transmitted by the radio access network node to the user equipment; at block 1615 wherein transmission of the second traffic flow to the user equipment is related to the first traffic flow, wherein the quality of service to be applied to the second traffic flow is a relative quality of service, and wherein the downlink quality of service indication comprises a relative downlink quality of service indication; and at block 1620 wherein the transmitting of the downlink quality of service indication is associated with the transmitting of the first traffic flow.

Turning now to FIG. 17, the figure illustrates an example user equipment 1700, comprising at block 1705 a processor configured to: transmit, to a radio access network node, a first protocol data unit corresponding to a first traffic flow; at block 1710 transmit, to the radio access network node, a downlink quality of service indication indicative of a quality of service to be applied to a second traffic flow to be transmitted by the radio access network node to the user equipment; at block 1715 wherein transmission of the second traffic flow to the user equipment is related to the first traffic flow, wherein the quality of service to be applied to the second traffic flow is a relative quality of service, and wherein the downlink quality of service indication comprises a relative downlink quality of service indication; at block 1720 wherein the processor is further configured to receive, from the radio access network node, a provisional semipersistent scheduling configuration comprising at least one downlink resource indication indicative of at least one downlink resource usable by the user equipment to receive at least one protocol data unit corresponding to the second traffic flow; at block 1725 receive, from the radio access network node, at least one protocol data unit corresponding to the second traffic flow according to the at least one downlink resource; and at block 1730 wherein the user equipment avoids waiting to receive, from the radio access network node, a grant indication indicative that the at least one downlink resource has been granted to the user equipment to receive the at least one protocol data unit corresponding to the second traffic flow.

Turning now to FIG. 18, the figure illustrates a non-transitory machine-readable medium 1800 comprising at block 1805 executable instructions that, when executed by a processor of a user equipment, facilitate performance of operations, comprising: based on transmitting, to a radio access network node, and as a result of the radio access network node having received, a downlink quality of service indication indicative of a quality of service to be applied to a traffic flow to be transmitted by the radio access network node to the user equipment, receiving, by the user equipment from the radio access network node, a provisional semipersistent scheduling configuration comprising at least one downlink resource indication indicative of at least one downlink resource usable by the user equipment to receive at least one protocol data unit corresponding to the traffic flow; at block 1810 receiving, by the user equipment from the radio access network node, at least one protocol data unit corresponding to the traffic flow according to the at least one downlink resource; and at block 1815 wherein the user equipment avoids waiting to receive, from the radio access network node, a grant indication indicative that the at least one downlink resource has been granted to the user equipment to receive the at least one protocol data unit corresponding to the traffic flow.

Figure 19:
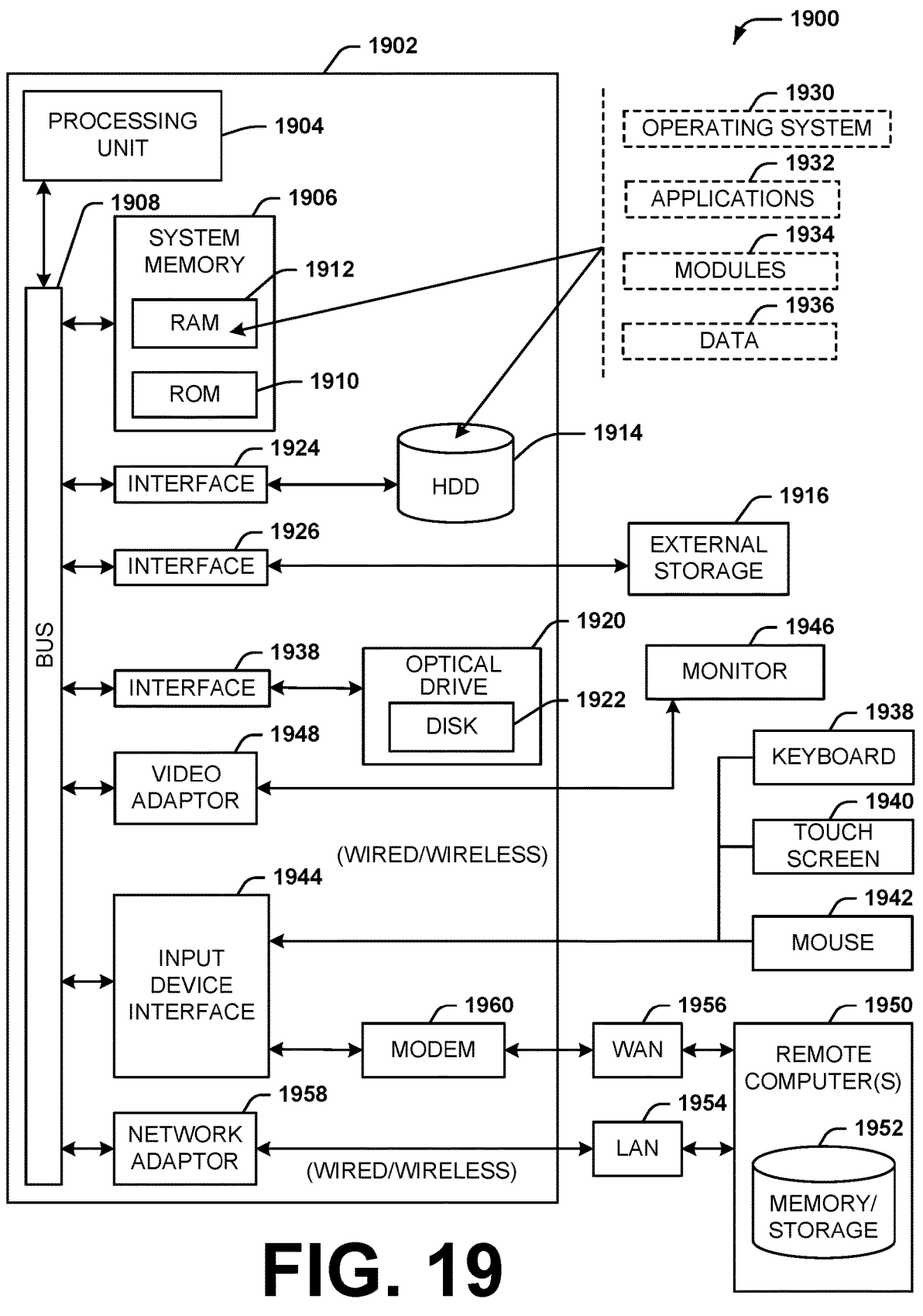
FIG. 19 illustrates an example computer environment.

In order to provide additional context for various embodiments described herein, FIG. 19 and the following discussion are intended to provide a brief, general description of a suitable computing environment 1900 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors and may include a cache memory. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

Computer 1902 further includes an internal hard disk drive (HDD) 1914 (e.g., EIDE, SATA), one or more external storage devices 1916 (e.g., a magnetic floppy disk drive (FDD) 1916, a memory stick or flash drive reader, a memory card reader, etc.) and an optical disk drive 1920 (e.g., which can read or write from a CD-ROM disc, a DVD, a BD, etc.). While the internal HDD 1914 is illustrated as located within the computer 1902, the internal HDD 1914 can also be configured for external use in a suitable chassis (not shown). Additionally, while not shown in environment 1900, a solid-state drive (SSD) could be used in addition to, or in place of, an HDD 1910. The HDD 1914, external storage device(s) 1916 and optical disk drive 1920 can be connected to the system bus 1908 by an HDD interface 1924, an external storage interface 1926 and an optical drive interface 1928, respectively. The interface 1924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for applications 1932. Runtime environments are consistent execution environments that allow applications 1932 to run on any operating system that includes the runtime environment. Similarly, operating system 1930 can support containers, and applications 1932 can be in the form of containers, which are lightweight, standalone, executable packages of software that include, e.g., code, runtime, system tools, system libraries and settings for an application.

Further, computer 1902 can comprise a security module, such as a trusted processing module (TPM). For instance, with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1946 or other type of display device can be also connected to the system bus 1908 via an interface, such as a video adapter 1948. In addition to the monitor 1946, a computer typically includes other peripheral output devices (not shown), such as speakers, printers, etc.

The computer 1902 can operate in a networked environment using logical connections via wired and/or wireless communications to one or more remote computers, such as a remote computer(s) 1950. The remote computer(s) 1950 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1952 is illustrated. The logical connections depicted include wired/ wireless connectivity to a local area network (LAN) 1954 and/or larger networks, e.g., a wide area network (WAN) 1956. Such LAN and WAN networking environments are commonplace in offices and companies, and facilitate enterprise-wide computer networks, such as intranets, all of which can connect to a global communications network, e.g., the internet.

When used in a LAN networking environment, the computer 1902 can be connected to the local network 1954 through a wired and/or wireless communication network interface or adapter 1958. The adapter 1958 can facilitate wired or wireless communication to the LAN 1954, which can also include a wireless access point (AP) disposed thereon for communicating with the adapter 1958 in a wireless mode.

When used in a WAN networking environment, the computer 1902 can include a modem 1960 or can be connected to a communications server on the WAN 1956 via other means for establishing communications over the WAN 1956, such as by way of the internet. The modem 1960, which can be internal or external and a wired or wireless device, can be connected to the system bus 1908 via the input device interface 1944. In a networked environment, program modules depicted relative to the computer 1902 or portions thereof, can be stored in the remote memory/ storage device 1952. It will be appreciated that the network connections shown are examples and other means of establishing a communications link between the computers can be used.

When used in either a LAN or WAN networking environment, the computer 1902 can access cloud storage systems or other network-based storage systems in addition to, or in place of, external storage devices 1916 as described above. Generally, a connection between the computer 1902 and a cloud storage system can be established over a LAN 1954 or WAN 1956 e.g., by the adapter 1958 or modem 1960, respectively. Upon connecting the computer 1902 to an associated cloud storage system, the external storage interface 1926 can, with the aid of the adapter 1958 and/or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 20:
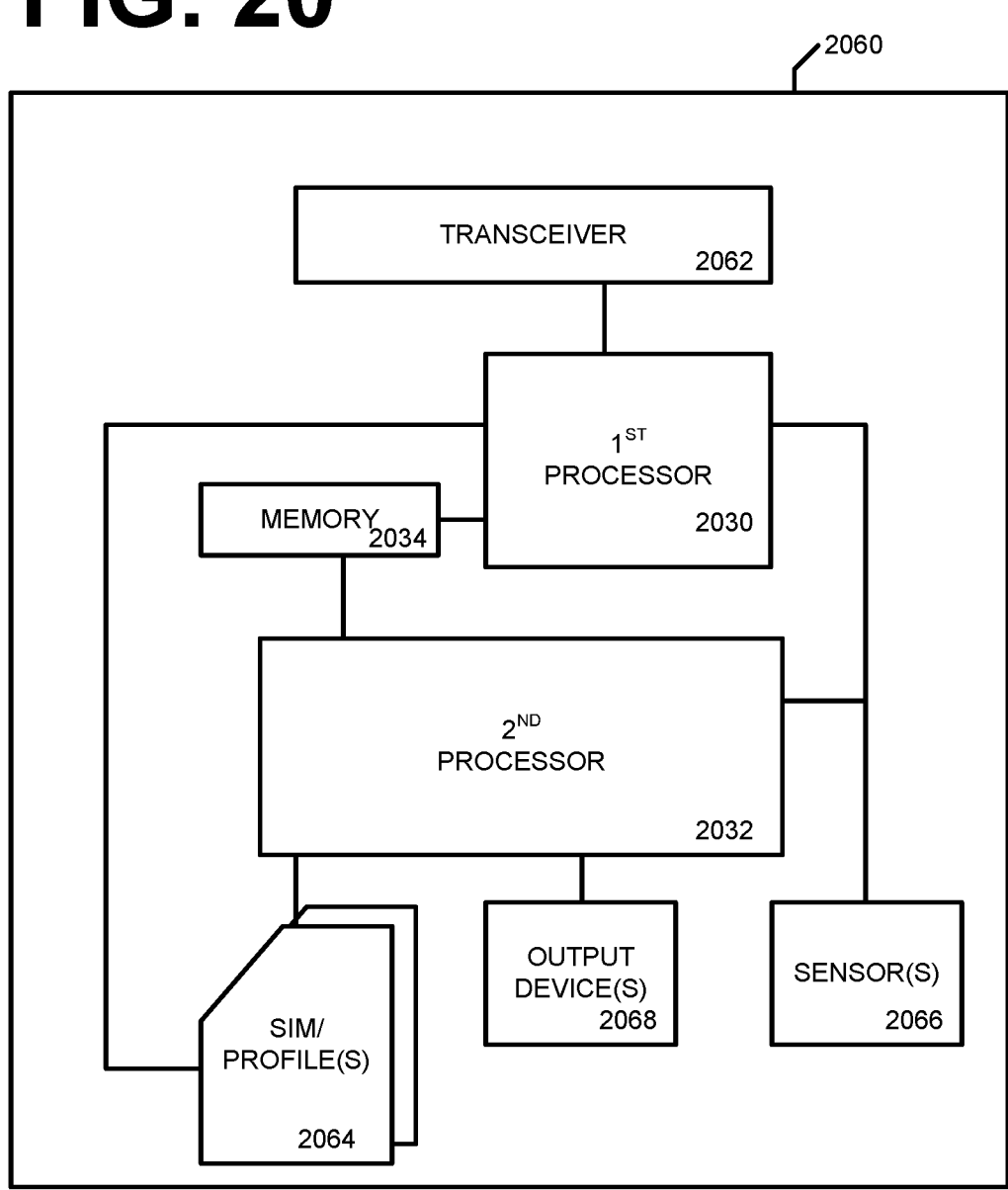
FIG. 20 illustrates a block diagram of an example wireless user equipment.

Turning now to FIG. 20, the figure illustrates a block diagram of an example UE 2060. UE 2060 may comprise a smart phone, a wireless tablet, a laptop computer with wireless capability, a wearable device, a machine device that may facilitate vehicle telematics, and the like. UE 2060 comprises a first processor 2030, a second processor 2032, and a shared memory 2034. UE 2060 includes radio front end circuitry 2062, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 2062 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 20, UE 2060 may also include a SIM 2064, or a SIM profile, which may comprise information stored in a memory (memory 2034 or a separate memory portion), for facilitating wireless communication with RAN 105 or core network 130 shown in FIG. 1. FIG. 20 shows SIM 2064 as a single component in the shape of a conventional SIM card, but it will be appreciated that SIM 2064 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 2064 and another device, which may be a component of RAN 105 or core network 130 shown in FIG. 1). A SIM profile 2064 may also comprise identifying information that is unique to the SIM, or SIM profile, such as, for example, an International Mobile Subscriber Identity ("IMSI") or information that may make up an IMSI.

SIM 2064 is shown coupled to both the first processor portion 2030 and the second processor portion 2032. Such an implementation may provide an advantage that first processor portion 2030 may not need to request or receive information or data from SIM 2064 that second processor 2032 may request, thus eliminating the use of the first processor acting as a 'go-between' when the second processor uses information from the SIM in performing its functions and in executing applications. First processor 2030, which may be a modem processor or baseband processor, is shown smaller than processor 2032, which may be a more sophisticated application processor, to visually indicate the relative levels of sophistication (i.e., processing capability and performance) and corresponding relative levels of operating power consumption levels between the two processor portions. Keeping the second processor portion 2032 asleep/ inactive/in a low power state when UE 2060 does not need it for executing applications and processing data related to an application provides an advantage of reducing power consumption when the UE only needs to use the first processor portion 2030 while in listening mode for monitoring routine configured bearer management and mobility management/maintenance procedures, or for monitoring search spaces that the UE has been configured to monitor while the second processor portion remains inactive/asleep.

UE 2060 may also include sensors 2066, such as, for example, temperature sensors, accelerometers, gyroscopes, barometers, moisture sensors, and the like that may provide signals to the first processor 2030 or second processor 2032. Output devices 2068 may comprise, for example, one or more visual displays (e.g., computer monitors, VR appliances, and the like), acoustic transducers, such as speakers or microphones, vibration components, and the like. Output devices 2068 may comprise software that interfaces with output devices, for example, visual displays, speakers, microphones, touch sensation devices, smell or taste devices, and the like, that are external to UE 2060.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a radio access network node comprising at least one processor, a first protocol data unit corresponding to a first traffic flow;

receiving, by the radio access network node, quality information associated with the first protocol data unit, wherein the quality information comprises a related traffic flow indication indicative of a second traffic flow related to the first traffic flow and a relative quality of service indication indicative of a relative quality of service criterion corresponding to the first traffic flow and the second traffic flow;

transmitting, by the radio access network node to a user equipment according to a first scheduling, a second protocol data unit corresponding to the second traffic flow; and transmitting, by the radio access network node to the user equipment according to a second scheduling, the first protocol data unit, wherein the first scheduling is determined, with respect to the transmitting of the first protocol data unit according to the relative quality of service criterion, and wherein the radio access network node does not notify the user equipment of the first scheduling.

2. The method of claim 1, wherein the quality information further comprises a first independent quality of service indication indicative of an independent quality of service criterion associated with the first traffic flow, and wherein the quality information further comprises a second independent quality of service indication indicative of the second traffic flow being associated with the independent quality of service criterion.

3. The method of claim 2, wherein the first protocol data unit is transmitted according to the independent quality of service criterion, and wherein the second protocol data unit is transmitted according to the independent quality of service criterion.

4. The method of claim 2, wherein the relative quality of service criterion corresponds to at least one of: a latency corresponding to at least one of the first traffic flow or the second traffic flow, a data rate corresponding to at least one of the first traffic flow or the second traffic flow, or a protocol data unit error rate corresponding to at least one of the first traffic flow or the second traffic flow.

5. The method of claim 2, further comprising:

prioritizing, by the radio access network node with respect to the independent quality of service criterion, the transmitting of the first traffic flow and the second traffic flow, the prioritizing being performed based on the relative quality of service criterion.

6. The method of claim 2, further comprising:

receiving, by the radio access network node, a relative quality of service criterion configuration comprising the relative quality of service criterion.

7. The method of claim 6, wherein the relative quality of service criterion configuration defines the relative quality of service criterion with respect to the independent quality of service criterion.

8. The method of claim 7, further comprising:

prioritizing, by the radio access network node with respect to the relative quality of service criterion, the transmitting of the first traffic flow and the second traffic flow, the prioritizing being performed based on the independent quality of service criterion.

9. The method of claim 1, wherein the quality information is received from a core network entity.

10. The method of claim 9, wherein the core network entity comprises a user plane function.

11. The method of claim 1, wherein the first protocol data unit and the quality information associated with the first protocol data unit are received via a backhaul communication link as part of a composite traffic message corresponding to the first traffic flow.

12. A radio access network node, comprising:

at least one processor configured to:

receive a composite traffic message corresponding to a first traffic flow, wherein the composite traffic message comprises at least one first packet corresponding to a first traffic flow and quality information associated with the at least one first packet, wherein the quality information comprises a related traffic flow indication indicative of a second traffic flow related to the first traffic flow and a relative quality of service indication indicative of a relative quality of service criterion corresponding to the first traffic flow and the second traffic flow;

transmit, to a user equipment according to a first scheduling, a second packet corresponding to the second traffic flow; and transmit, to the user equipment, at least one of the at least one first packet according to a second scheduling, wherein the first scheduling is determined, with respect to the at least one of the at least one first packet being transmitted, according to the relative quality of service criterion, and wherein the radio access network node avoids notifying the user equipment of the first scheduling.

13. The radio access network node of claim 12, wherein the quality information further comprises a first independent quality of service indication indicative of an independent quality of service criterion associated with the first traffic flow, wherein the quality information further comprises a second independent quality of service indication indicative of the second traffic flow being associated with the independent quality of service criterion, and wherein the at least one first packet is transmitted further according to the independent quality of service criterion, and wherein the second packet is transmitted further according to the independent quality of service criterion.

14. The radio access network node of claim 12, wherein the at least one processor is further configured to:

receive, from core network equipment, a relative quality of service criterion configuration comprising the relative quality of service criterion.

15. The radio access network node of claim 13, wherein the at least one first packet is transmitted, according to the relative quality of service criterion, based on the transmitting of the second packet to the user equipment.

16. The radio access network node of claim 12, wherein the quality information is received from a core network entity.

17. A non-transitory machine-readable medium, comprising executable instructions that configure at least one processor of a radio access network node to perform operations, comprising:

receiving a first protocol data unit corresponding to a first traffic flow directed to a user equipment;

receiving a related traffic flow indication indicative of a second traffic flow related to the first traffic flow and a relative quality of service indication indicative of a relative quality of service criterion corresponding to the first traffic flow and the second traffic flow, wherein the first traffic flow and the second traffic flow correspond to an independent quality of service criterion;

transmitting, to the user equipment according to a first scheduling, a second protocol data unit corresponding to the second traffic flow; and transmitting, to the user equipment, the first protocol data unit according to a second scheduling, wherein the first scheduling is determined, with respect to the transmitting of the first protocol data unit, and wherein the radio access network node does not notify the user equipment of the first scheduling.

18. The non-transitory machine-readable medium of claim 17, the operations further comprising:

determining that a second protocol data unit corresponding to the second traffic flow is available for transmission to the user equipment;

transmitting the second protocol data unit to the user equipment according to the independent quality of service criterion;

analyzing the relative quality of service criterion with respect to the independent quality of service criterion to result in an analyzed relative quality of service criterion;

determining, based on the analyzed relative quality of service criterion, that transmission, to the user equipment, of the first protocol data unit according to the independent quality of service criterion is threshold likely to fail to satisfy the relative quality of service criterion, to result in a determined relative quality of service criterion; and based on the determined relative quality of service criterion, prioritizing, with respect to the independent quality of service criterion, transmission of the first protocol data unit according to the relative quality of service criterion, wherein the transmitting of the first protocol data unit is performed according to the relative quality of service criterion.

19. The non-transitory machine-readable medium of claim 17, the operations further comprising:

determining that a second protocol data unit corresponding to the second traffic flow is available for transmission to the user equipment;

transmitting the second protocol data unit to the user equipment according to the independent quality of service criterion;

analyzing the relative quality of service criterion with respect to the independent quality of service criterion to result in an analyzed relative quality of service criterion;

determining, based on the analyzed relative quality of service criterion, that transmission, to the user equipment, of the first protocol data unit according to the independent quality of service criterion is threshold likely to satisfy the relative quality of service criterion, to result in a determined relative quality of service criterion; and based on the determined relative quality of service criterion, prioritizing, with respect to the relative quality of service criterion, transmission of the first protocol data unit according to the independent quality of service criterion, wherein the transmitting of the first protocol data unit is performed according to the independent quality of service criterion.

20. The non-transitory machine-readable medium of claim 17, the operations further comprising:

determining that a second protocol data unit corresponding to the second traffic flow is unavailable for transmission to the user equipment, wherein the transmitting of the first protocol data unit is performed according to the independent quality of service criterion.

* * * * *